US008271884B1

(12) United States Patent
Smaltz

(10) Patent No.: US 8,271,884 B1
(45) Date of Patent: Sep. 18, 2012

(54) GRAPHICAL ANIMATION ADVERTISING AND INFORMATIONAL CONTENT SERVICE FOR HANDHELD DEVICES (GADS)

(76) Inventor: David Gene Smaltz, Peabody, MA (US)

( * ) Notice: Subject to any disclaimer, the term of this patent is extended or adjusted under 35 U.S.C. 154(b) by 1042 days.

(21) Appl. No.: 11/949,037

(22) Filed: Dec. 2, 2007

Related U.S. Application Data

(60) Provisional application No. 60/872,898, filed on Dec. 5, 2006.

(51) Int. Cl.
*G06F 3/00* (2006.01)
(52) U.S. Cl. ........................................................ 715/744
(58) Field of Classification Search .................... 715/744
See application file for complete search history.

(56) References Cited

U.S. PATENT DOCUMENTS

| | | | | |
|---|---|---|---|---|
| 5,748,199 A * | 5/1998 | Palm | | 345/473 |
| 5,987,480 A * | 11/1999 | Donohue et al. | | 715/207 |
| 6,466,783 B2 * | 10/2002 | Dahm et al. | | 455/414.2 |
| 7,155,508 B2 * | 12/2006 | Sankuratripati et al. | | 709/224 |
| 7,281,252 B1 * | 10/2007 | Lindquist et al. | | 719/332 |
| 7,421,645 B2 * | 9/2008 | Reynar | | 715/206 |
| 7,761,799 B2 * | 7/2010 | Pell et al. | | 715/745 |
| 7,804,503 B2 * | 9/2010 | Fernandez et al. | | 345/475 |
| 8,136,100 B1 * | 3/2012 | Goldman | | 717/136 |
| 2002/0133545 A1 * | 9/2002 | Fano et al. | | 709/203 |
| 2006/0025108 A1 * | 2/2006 | Pell et al. | | 455/405 |
| 2007/0262996 A1 * | 11/2007 | Fernandez et al. | | 345/473 |
| 2007/0299964 A1 * | 12/2007 | Wong et al. | | 709/224 |
| 2008/0195692 A1 * | 8/2008 | Hayosh et al. | | 709/202 |

OTHER PUBLICATIONS

Shane Conder & Lauren Darcy, "Learn Java for Android Development: Reflection Basics", http://mobile.tutsplus.com/tutorials/android/java-reflection/, Oct. 2010.*

* cited by examiner

*Primary Examiner* — William Bashore
*Assistant Examiner* — Henry Orr

(57) ABSTRACT

Compiled computer code loaded on a mobile networked device implementing aspects of graphical animation capabilities, which include at least one of lateral movement, vertical movement, timing of movement and behavior. A network communication initiated by the code retrieves new instructions previously assembled in programmed browser and stored on programmed server. The new instructions direct the code to create content objects and download content object components, such as, but not limited to, graphic image, graphic images in frame sequence for animation, video, audio, and text elements. The instructions trigger selected ones of the coded aspects of graphical animation capabilities on the content objects to produce presentations. New instructions downloaded from the server trigger different coded aspects of graphical animation capabilities on the same or different content objects and content object components to change and display new presentations without having to program, compile and download new code on the mobile networked device.

27 Claims, 20 Drawing Sheets

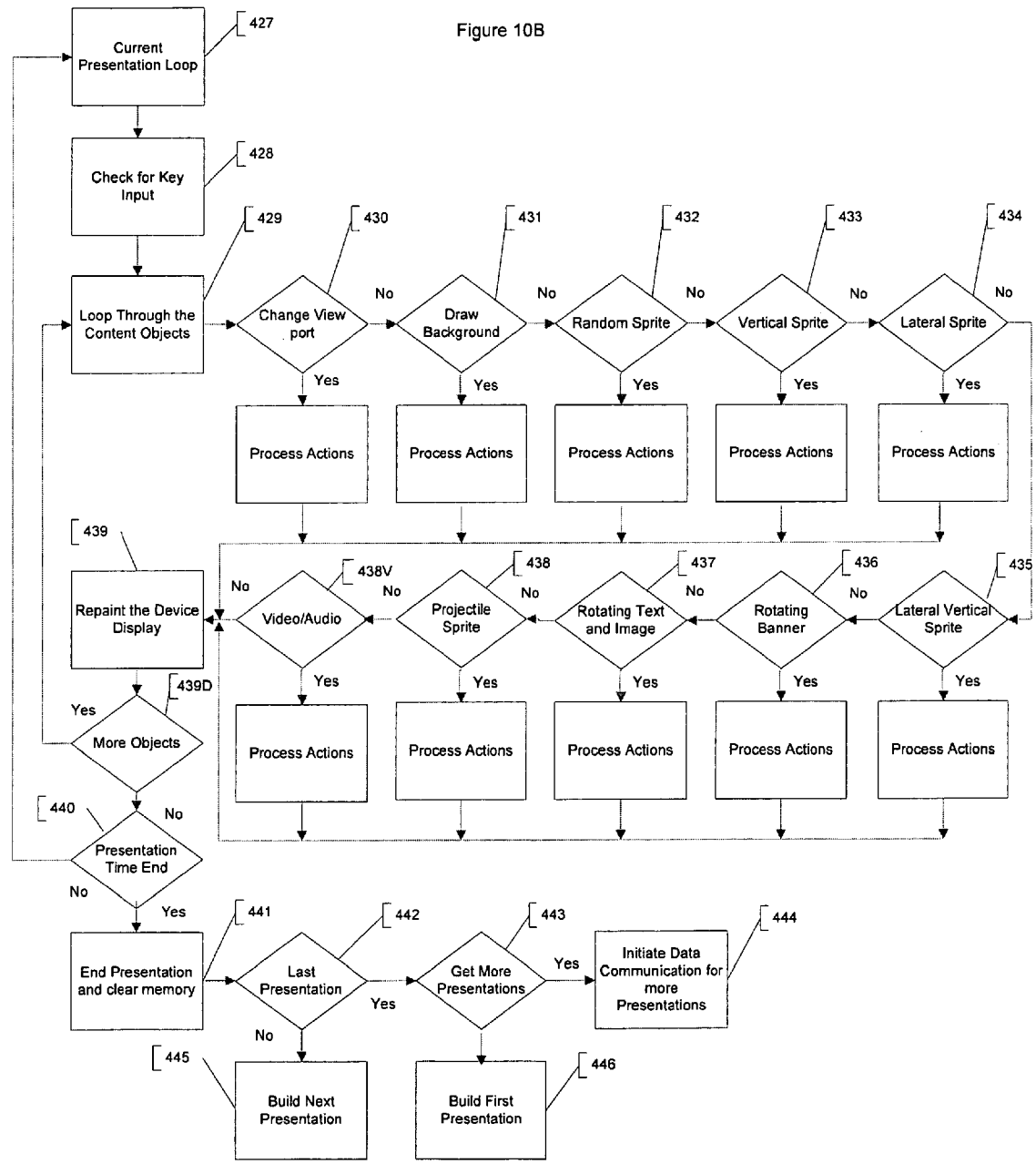

GRAPHICAL ANIMATION ADVERTISING AND INFORMATIONAL CONTENT SERVICE FOR HANDHELD DEVICES (GADS)

This application claims priority under 35 U.S.C. §119 (e) from provisional application Ser. No. 60/872,898 filed on Dec. 5, 2006.

BACKGROUND OF THE INVENTION

1. Field of the Invention

The invention relates to apparatus, methods, etc. used for mobile telecommunications. More particularly, it relates to those apparatus, methods in which information, games, advertising and other content are retrieved over a mobile network from the Internet and presented on mobile networked devices.

2. Background Art

Voice communications has been the primary service provided by mobile network operators. Capabilities for providing mobile data communication services, however, are now being deployed on a relatively widespread basis and are expected by many to represent a significant area of growth in the years ahead. Providing applications for use on mobile networked devices is one significant area of mobile data services. Such applications may include instant messaging, games, news and productivity enhancement tools; all of which will probably involve advertising.

Different strategies for providing such applications have emerged. Much of the initial development focused on server-side execution of applications in which most of the processing power resides in the network operator's, or a third party's, servers. This strategy was employed, for example, by the wireless application protocol (WAP), which uses WAP browsers to receive and display content and applications that are generated by remote servers. User responses are then sent back through the network to the remote servers for processing and any further actions. Thus, there can be significant delays as information is sent back and forth between the mobile networked device and the remote server.

As processors have become smaller and cheaper, along with cheaper and more compact memories, it has become more feasible to increase the processing power on the mobile networked device which enables applications to be implemented locally on the mobile networked device. Sun Microsystems's Java technology, which is implemented on mobile networked devices as J2ME, offers one possible way of implementing applications on mobile networked devices which is described in further detail at http://www.java.sun.com; Qualcomm has developed the Binary Runtime Environment for Wireless (BREW) platform, which is described in further detail at http://www.qualcomm.com/brew; Flash Lite has been implemented for development of applications, with more information at http://www.adobe.com/products/flashlite; Microsoft has implemented Windows Mobile for mobile networked devices; and finally Google has announced the launch of its own mobile networked device with a proprietary operating system and the Android Software Developer Kit for developers using Java. Moreover, all of these technologies allow applications to be downloaded over the air and stored locally on a mobile networked device.

There are Also Limitations

On desktop computer machines, applications can load new classes from external sources while the application is running to alter functionality or content presented to the user. This capability has been misused by developers and has resulted in a vast number of unwanted destructive viruses and adware being installed on desktop computers. Care was taken in writing standards for mobile networked devices to provide more security with what is called the "sandbox" model to prevent this from occurring on these devices. Mobile network application security is important to everyone involved in the industry, so the security on mobile networked devices is not likely to be loosened by carriers and software standards for the following reasons:

Mobile network carriers want to be sure that viruses do not bring down their customers' devices or their networks.

Device manufacturers don't want customer installed software crashing their devices.

Users want to download and run code without the fear that the code will take over their device or plant a virus or spywear on their device. Additionally, users want control over expensive network usage.

Application developers want to know that their applications will not be compromised by other applications.

And no one wants to have to install security software on their mobile networked device to prevent viruses and spywear.

The sandbox security on mobile networked devices limits applications to only the compiled code that was originally downloaded and installed by the user. While this security model prevents the devious attacks mentioned above, it also prevents the download of additional code to make new functionality available to applications running on the devices. On most mobile platforms, applications are only allowed to download image, byte data, text files and video. Due to the sandbox, games, content and advertising is thus tethered to the code initially downloaded by the user. A game or ad can change the images presented by downloading new image files, but it can't change the behavior of the game or ad while running. To play a different game, display another ad, or animation exhibiting different behavior requires the download and installation of new compiled code or loading new pages in the browser on the mobile networked device, thus limiting the extent to which authors of such content can alter the behavior while running on the mobile networked device.

There is also limited bandwidth available on most mobile networks where the download of only 100 kb during busy network times can cause the mobile networked device to appear frozen to the user. Even with the improvements to mobile networks, there are physical limitations that restrict network throughput. Mobile networked device users often incur steep charges for downloading content over the mobile network and they resent charges for advertising content. Moreover, even if the mobile networked devices and network usage were to be offered free in exchange for downloaded advertising, users will resent the extra time it takes to download the ads.

Thus the inventor was motivated to find an efficient method to deliver and display a plurality of graphical presentations and or advertising and games to mobile networked devices without having to reprogram said mobile networked devices to display each distinct said graphical presentation.

BRIEF DESCRIPTION OF TERMS

Sprite—A term that has become accepted in computer gaming to refer to a protagonist in a game. Sprites are represented with images and movement which change according to code in the compiled application. The Java, BREW, Flash Lite and Windows Mobile languages enable the use of several types of Sprites that include, but are not limited to: Random, Vertical, Lateral, Lateral and Vertical Projectile, Rotating Text and Image and Rotating Banner. Some of these Sprites are partially defined in the languages and others are created using base code in the languages.

Graphical animation capabilities—A set of code which executes an aspect of graphical display and or movement logic on the mobile networked device such as image display, vertical, lateral, both vertical and lateral, or random movement of a graphical image, or removal of image upon collision with another image.

Presentation—A term used in the field of the invention to refer to the graphical rendering and movements produced on the screen of the mobile networked device which is produced by instructions triggering the graphical animation capabilities.

Collection of Presentations—A term used in the field of the invention to refer to a series of Presentations delivered to the mobile networked device.

Perpetrator—A term used to define a Sprite which causes other Sprites to be removed from the Presentation upon collision with it.

Server—A machine on a network which can run compiled code of the invention which accepts connections and can send content and instructions to a mobile networked device or application on a mobile networked device.

Instructions—The delimited integers, characters and bitmasks that trigger the graphical animation capabilities. For a Random Sprite the instructions may include, but not be limited to, the URL address for the image to display, frequency, location and dimensions used to create the Random Sprite, the maximum number of Random Sprites to create and a protagonist that may remove the Random Sprite upon collision.

Mobile networked device—A mobile networked device includes a processor, display screen, and possibly storage. The device is either physically connected to a network or connected to a network over the air using some type of mobile network technology, such as, but not limited to wireless cellular communication. Such mobility may be accomplished by a person carrying the device or the device being installed in some other component or larger mobile networked device.

Entity—An organization or business with members or customers who would view advertising.

OBJECTS AND ADVANTAGES

The inventor recognized that the security restrictions enforced on mobile networked devices and network bandwidth limitations would severely hinder the variety of graphical Presentations, games, advertising and other graphical content that could be efficiently presented on mobile networked devices. The extent of change an application could affect would be limited to just changing the images and text on the screen or loading new videos or sounds to play. Anything to do with changing the movement and behavior of the downloaded content would involve the download of a new compiled application or new web pages. The previously discussed programming languages as delivered by the respective vendors do not provide any code or methods which could be used, as is, to affect a change in animated movement or game logic from what was originally compiled as an application by the developer using the language and then subsequently downloaded by the mobile networked device. Some offer flexibility to download new text, images and or video files, but no functionality exists to enable a complete change in animation, game logic or overall appearance of the Presentation as compiled and installed on the mobile networked device.

The inventor further recognized that all graphical animation capabilities on mobile networked devices could be abstracted, compiled and then downloaded and loaded on to the mobile networked device, providing the capability to present all possible movements and behaviors that could take place on the screen. Once loaded, the graphical animation capabilities could be triggered by instructions from a web server to the application code running on the device to present a particular screen action, such as lateral and or vertical movement, random creation of Sprites, projectiles, collisions and other graphic content that are used in games and or ads.

The abstraction of the basic graphical capabilities available in programming languages into graphical animation capabilities provides the ability to present various advertising, games and animation on the screen without downloading new code to the mobile networked device. Desired behavioral characteristics could be triggered in an application running on the mobile networked device by instructions in the form of integers, characters or bitmasks sent in a small text file from a web application server; thus performing within the sandbox designed and enforced by network providers and making more efficient use of limited mobile network bandwidth.

Animations presented by the invention on mobile networked device screens may be part of an application or independent of a particular application. The invention code would be self contained and could be a standalone application or embedded in another application, a browser plug-in or a background thread running on the startup of the mobile networked device. The invention would operate as a service for the presentation of games and advertising or a game that imparts advertising material on a mobile networked device. The inventor therefore surmised that the most appropriate descriptive name for the service should be Graphical Animation Advertising and Informational Content Service for Handheld Devices or GADS.

In summary, GADS overcomes the limitations of existing technology by providing a more efficient method for the delivery of a plurality of graphical Presentations and or advertising and games on networked devices. While existing technology requires the download of compiled code or scripting languages to affect logic and behavioral changes to Presentations and games, GADS requires only new instructions to accomplish the same changes. When used as a service by entities, hours of programming time is saved producing ads for users who are also spared the inconvenience of massive downloads over limited bandwidth for advertising and games.

SUMMARY OF THE INVENTION

GADS implementations may include one or more of the following features. For example, instructions for one or more Presentations and informational content as a collection of Presentations may be downloaded to the mobile networked device over a mobile network interface. The instructions are then used to download content object components to the device and present the content object components on the mobile networked device with movement and animation that may impart an advertising message, a game or other informational content.

The invention is a set of code which defines all aspects of graphical movement in graphical animation capabilities and logic on the mobile networked device which may include vertical, lateral, both vertical and lateral, random, or removal of content objects upon collision of content objects. The plurality of instantiations, combinations and presentation of these capabilities are triggered by the instructions downloaded to the application running on the mobile networked device.

Once all instructions for all Presentations in the collection have been loaded in an array in the invention a background process is started on the mobile networked device in accordance with the invention. The code then runs in the background and loops through the objects, creating each Presentation by executing the code for the graphical animation capabilities. The application then presents the graphics on the device screen and then loops through the instantiated types and moves them according to the instructions provided. Thus the instructions are used by the invention to provide a graphical Presentation on the screen of the mobile networked device.

The instructions include a time limit. After the Presentation is displayed on the device and the time limit has expired, the instructions for the next Presentation are used to create a new graphical Presentation. Content object components may be downloaded prior to the expiration of the previous Presentation for inclusion in the next Presentation. With the instructions and content object components previously downloaded to the mobile networked device from the web application server, a new Presentation is presented on the mobile networked device that is completely different from the previous Presentation.

It is an object of the invention to program a mobile networked device to operate in accordance with a set of code, based upon a programming language to implement graphical animation capabilities to be triggered by instructions to present graphical animation and informational content on a mobile networked device.

It is a further object of the invention to program a web application server to send code to a browser that effectuates the creation of instructions for graphical animation capabilities and return them to the web application server.

It is a further object of the invention to provide a means store in a database the instructions returned to the web application server from the browser code. The instructions are store in the database in an order of collections of Presentations.

It is a further object of the invention to program a mobile networked device to initiate a network communication to a remote web application server to download the Presentation instructions and URL locations of content object components to be used to create a collection of Presentations on the mobile networked device.

It is another object of the invention to a program mobile networked device to execute graphical animation capabilities when triggered by the downloaded instructions; thus, resulting in a Presentation of advertising, informational content list or game.

It is another object of the invention to initiate another network communication to a remote web application server, after a specified period of time, to download more instructions and URL locations of content object components to create a new collection of Presentations on the mobile networked device.

These objects and others are achieved in accordance with the invention by THIS WILL NOW FOLLOW LANGUAGE OF CLAIMS.

BRIEF DESCRIPTION OF THE DRAWINGS

The foregoing aspects and other features of the present invention are explained in the following description, taken in connection with the accompanying drawings, wherein:

FIG. 10B is a flow diagram of the process of running a Presentation that has been loaded into the invention.

DETAILED DESCRIPTION OF THE PREFERRED EMBODIMENT

Techniques for sending instructions and graphical or text elements to the invention running as an application or browser plug-in on a mobile networked device to trigger graphical animation capabilities to display or otherwise present collections of graphical Presentations to a user of a mobile networked device, which may also include an audio or video component.

Although the techniques are described below primarily in the context of the Java J2ME platform, the techniques are also applicable in connection with the other platforms for supporting client-side application processing, mention above in Background Art.

Figure 1:
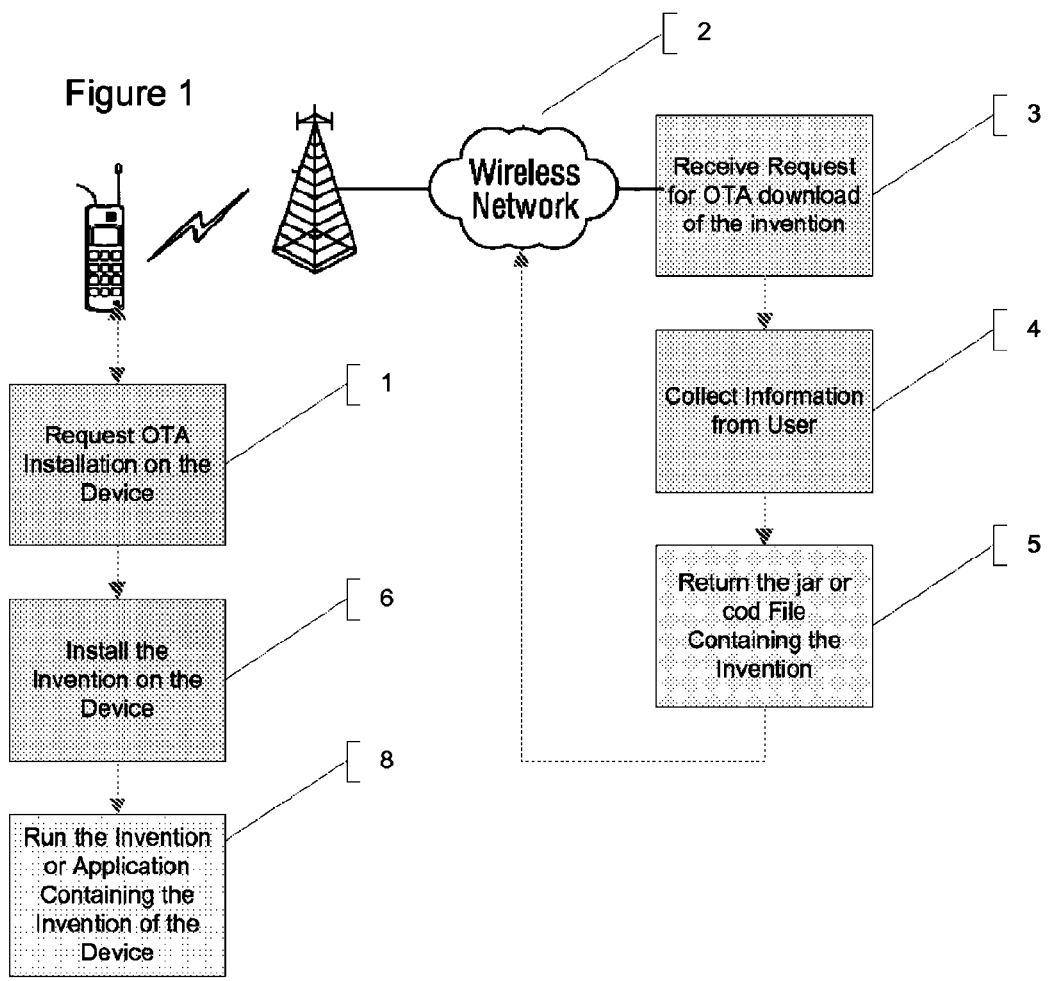
FIG. 1 is a flow diagram of the method used to download the application in accordance with the invention to the mobile networked device.

FIG. 1 is a flow diagram of how the invention is downloaded by the user and installed on a mobile networked device supporting J2ME. A J2ME jar or cod file is requested by the user from the handheld device (step 1) over the air or OTA (step 2). When the web server receives the request from the mobile networked device (step 3) it may request information from the mobile networked device user including, but not limited to name and demographics, occupation and interests (step 4). The application with the invention embedded or by itself is sent to the mobile networked device (step 5) OTA (step 2). The user then selects to install the invention or application containing the invention on the mobile networked device (step 6). The user then runs the invention or application containing the invention on the mobile networked device (step 8).

Figure 2:
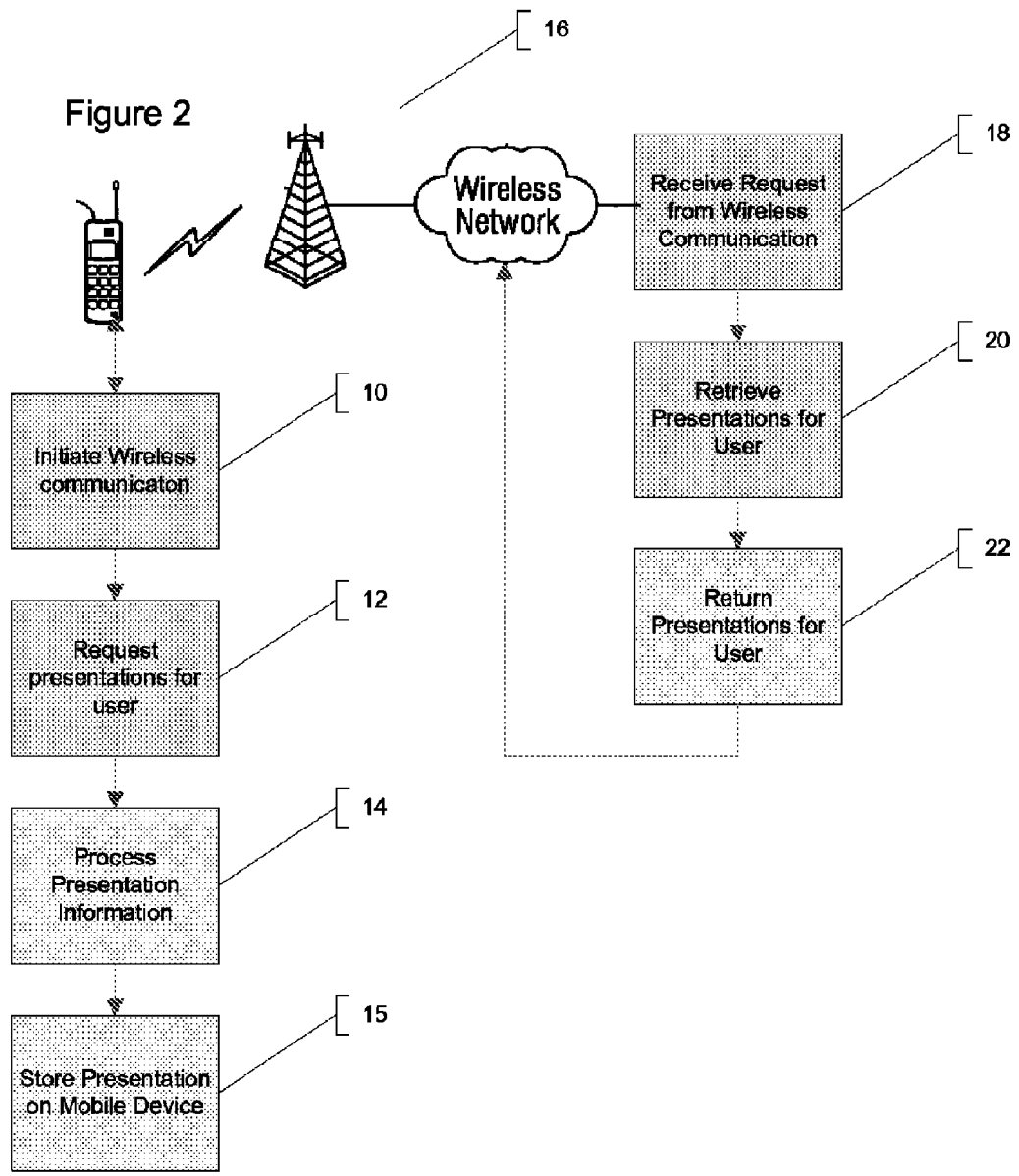
FIG. 2 is a flow diagram of the method used on the mobile networked device to communicate with a web application server in accordance with the invention to retrieve Presentation instructions.

FIG. 2 is a flow diagram of the invention downloading instructions for Presentations on a mobile networked device. The invention may be stored on the mobile networked device at the time of manufacture or may be subsequently loaded onto the device, including through the use of an over the air (OTA) downloading procedure. The invention on the mobile networked device requests communication with a Web Application server (step 10) over the air (step 16) and requests instructions for Presentations from the application server (step 12), passing user credentials and possibly location information, utilizing Global Positioning Technology on the mobile networked device. The web application server receives the request for instructions for Presentations (step 18) over the connection (step 16). Instructions for Presentations are retrieved from a data store (step 20) and returned over the connection to the invention on the mobile networked device (steps 22 and 16). The mobile networked device processes the instructions for Presentations and stores the information on the mobile networked device (step 15).

Figure 3:
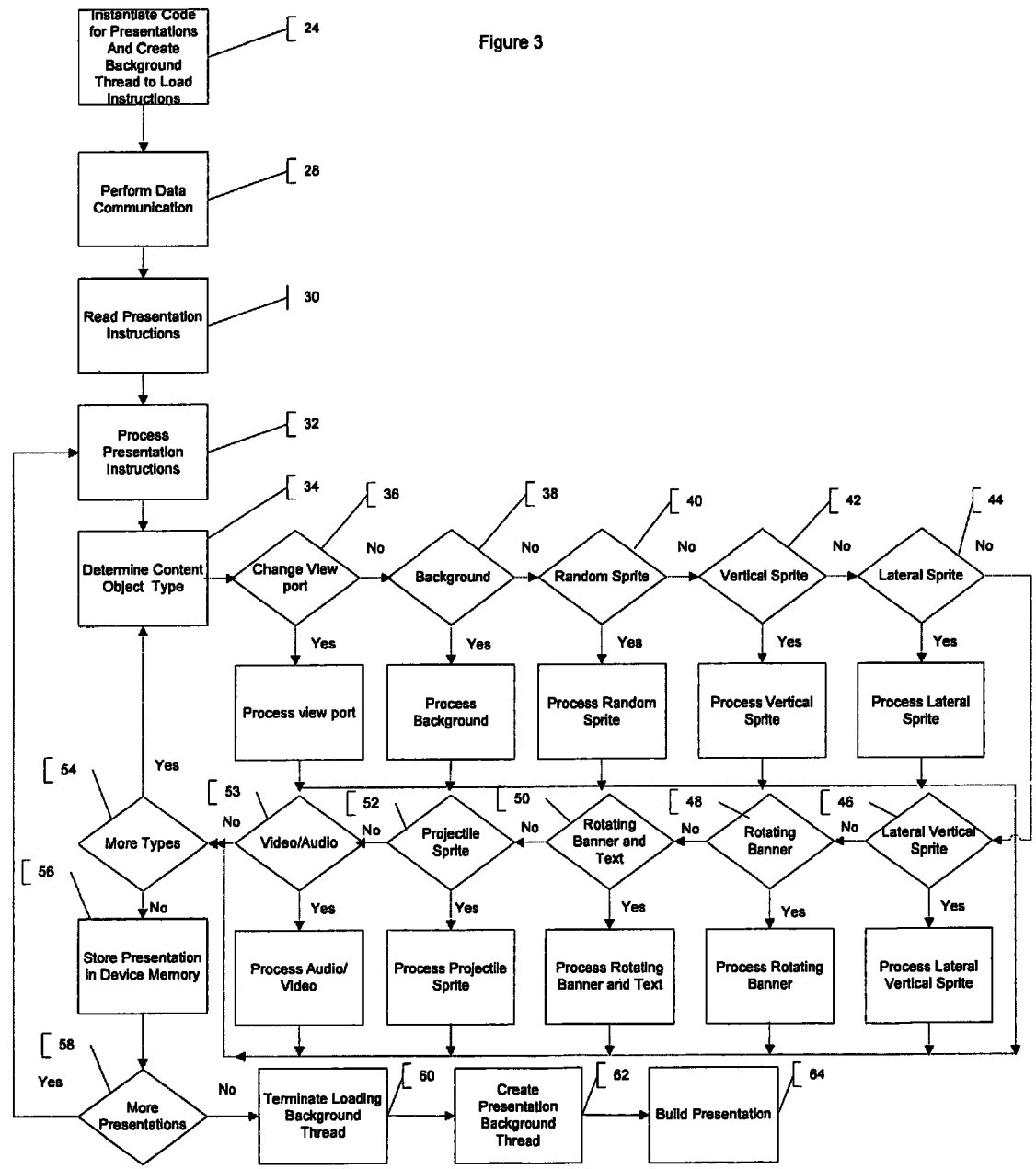
FIG. 3 is a flow diagram of the method used by the invention to load instructions for Presentations sent by the web application server into the mobile networked device.

FIG. 3 is a flow diagram of how Presentations are processed by the invention and stored on the mobile networked device. The process begins by instantiating code to store the instructions for Presentations and creates a Background thread to read and store the instructions for the Presentations (step 24). A request is then made for instructions from a web application server (step 28) as described with reference to FIG. 2. Each Presentation is instantiated with instructions that may include, but are not limited to, URL locations of graphical or text elements, type, size, duration and screen refresh rate (steps 30 and 32). Then instructions are processed according to the type component (e.g., Video/Audio) or Sprite (e.g., Projectile Sprite) contained in the Presentation by calling methods to add the various types (steps 34 through 53). Each Sprite type is added to an array to be later enumerated and added to the graphics manager in the application on the mobile networked device (step 56).

The invention repeats steps 34 through 54 until the instructions sent by the web application server indicate the end of the Presentation. Then the invention stores the information about the Presentation in memory on the mobile networked device (step 56).

If more Presentations in the collection are sent by the web application server over the connection, the invention repeats steps 34 through 56 until the instructions indicate that there are no more Presentations in the collection (step 58). The invention then terminates the background thread for loading Presentation instructions and creates a new background thread for running the Presentation collection and then follows the instructions sent by the web application server to begin the first Presentation (steps 60 through 64).

Figure 4:
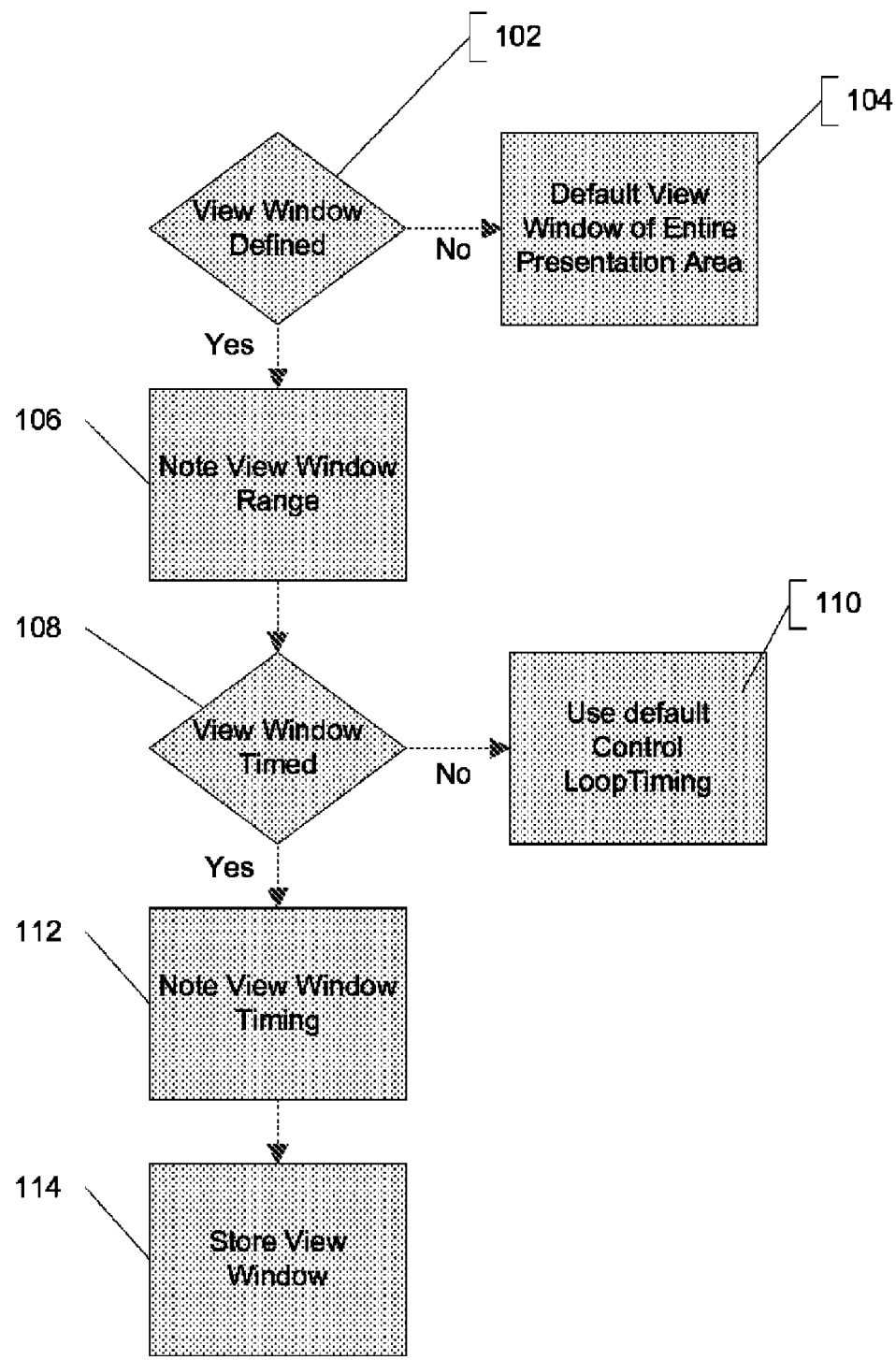
FIG. 4 is a flow diagram of the process for loading the View Window for a Presentation into the invention.

FIG. 4 is a flow diagram that describes how a View Window is added to a Presentation. Instructions on when to adjust the View Window are added to the object in the array to be used to change the View Window of the Presentation. If a View Window has been defined, a check is done to see if a range has been defined (step 102). If a view range is defined it is saved (step 106) and if not, the entire Presentation area is used for the View Window (step 104) and if a timing for the View Window adjustment is specified, it is saved (steps 108 and 112). If no timing has been specified, the default control loop timing it used (step 110). The invention then stores the View Window information in the Presentation (step 114).

Figure 5:
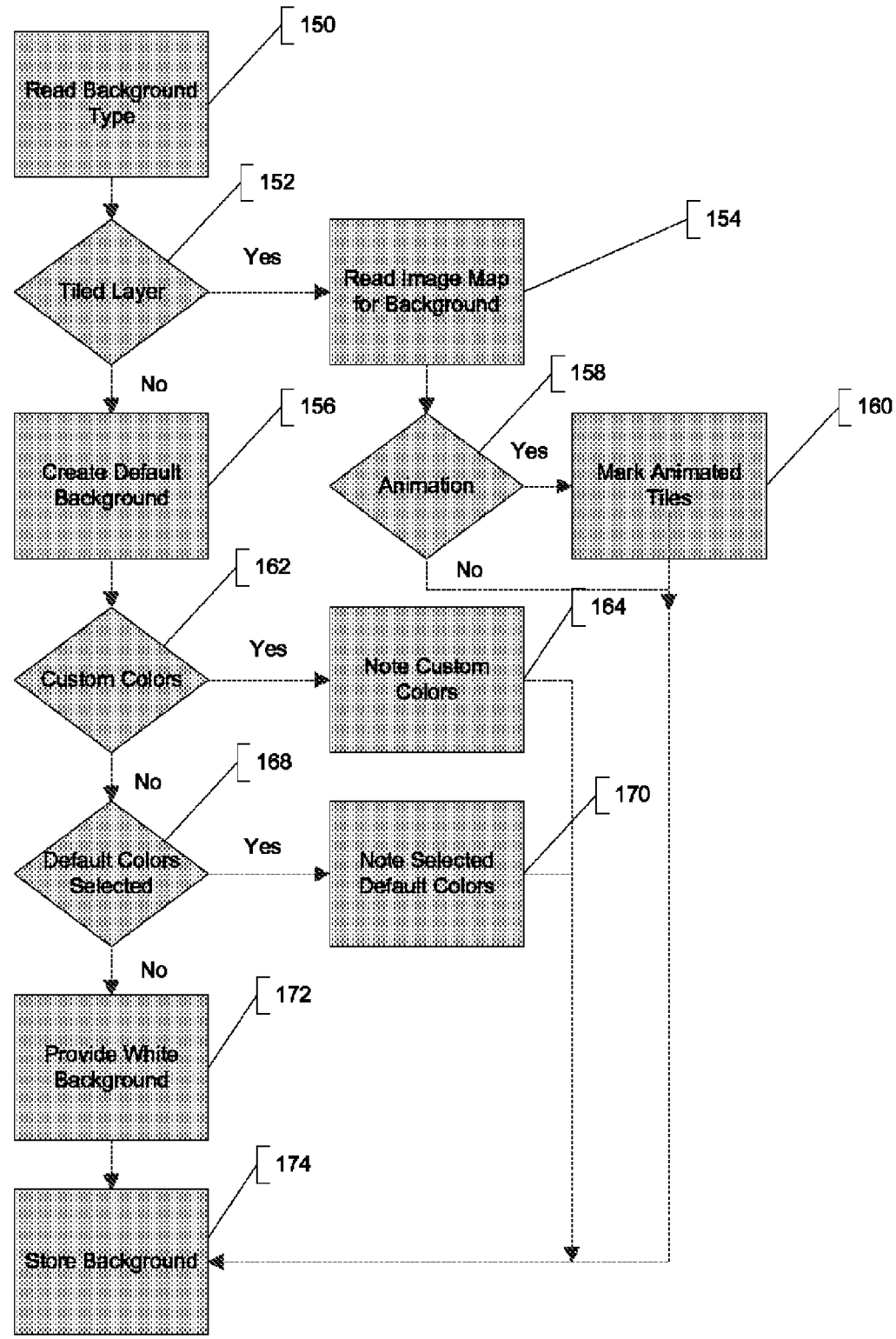
FIG. 5 is a flow diagram of the process for loading a Background for the Presentation into the invention.

FIG. 5 is a flow diagram that describes how a graphic Background can be specified for the Presentation. The invention allows for a Tiled Layer to be provided for Presentations. A Tiled Layer is a visual element composed of a grid of cells that can be filled with a set of tile images. If a Tiled Layer has been defined, the URL of the image to be used for the Tiled Layer is read from the instructions (steps 152 and 154). Animation can also be defined for the Tiled Layer Background (steps 158 and 160). Animated tiles enable the invention to change the appearance of the Presentation Background. The instructions sent to the invention can include details on how to move the tiles around to create an animated effect. If a Tiled Layer is not specified in the instructions, a custom color for the Background can be specified (steps 162 and 164). The invention includes a set of default Background colors found on most mobile networked devices which can be specified in the instructions for the Presentation (steps 168 and 170). If the instructions do not specify a Background, a white Background color is provided by the invention (step 172). The invention then stores the Background information in the Presentation (step 174).

Figure 6:
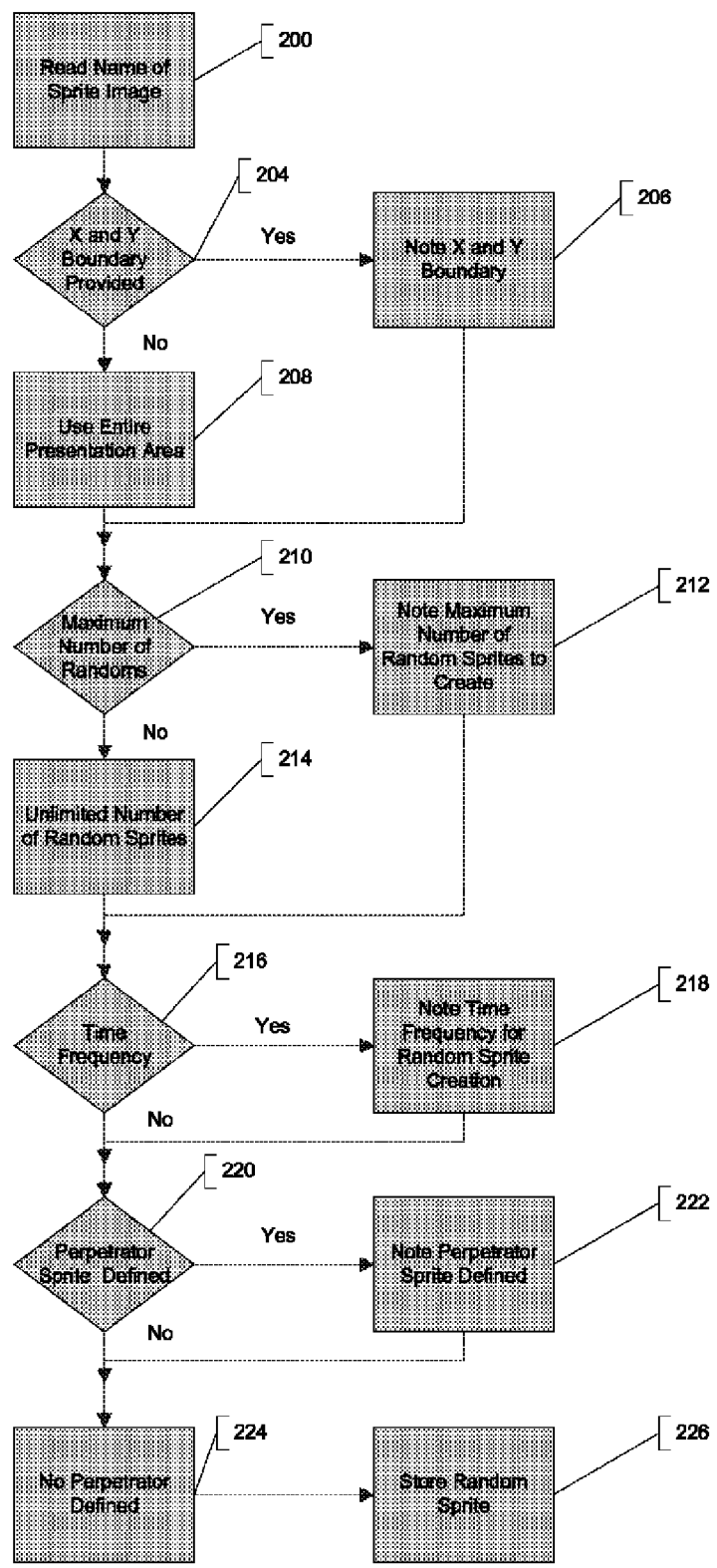
FIG. 6 is a flow diagram of the process for loading instructions for a Random Sprite into the invention.

FIG. 6 is a flow diagram that describes how a Random Sprite can be added to a Presentation. A Random Sprite is an image that is created at specified intervals and place in random positions within the defined Presentation area. The instructions from the web application server must contain a URL for the image to be used for the Random Sprite (step 200). A specific area in the Presentation can be specified or the entire Presentation area is used as a boundary for creation of Random Sprites (steps 204 through 208). The maximum number of Random Sprites to be created can also be specified in the instructions (step 210 and 212). If a maximum number is not specified, Random Sprites are created until the Presentation ends (step 214). A frequency must also be provided in the instructions to determine how often the Random Sprites are to be created and placed in the Presentation (steps 216 and 218). A perpetrator can be defined in the instructions for a Random Sprite (step 220 and 222). The instructions for the Random Sprite is then stored in memory (step 226).

Figure 7:
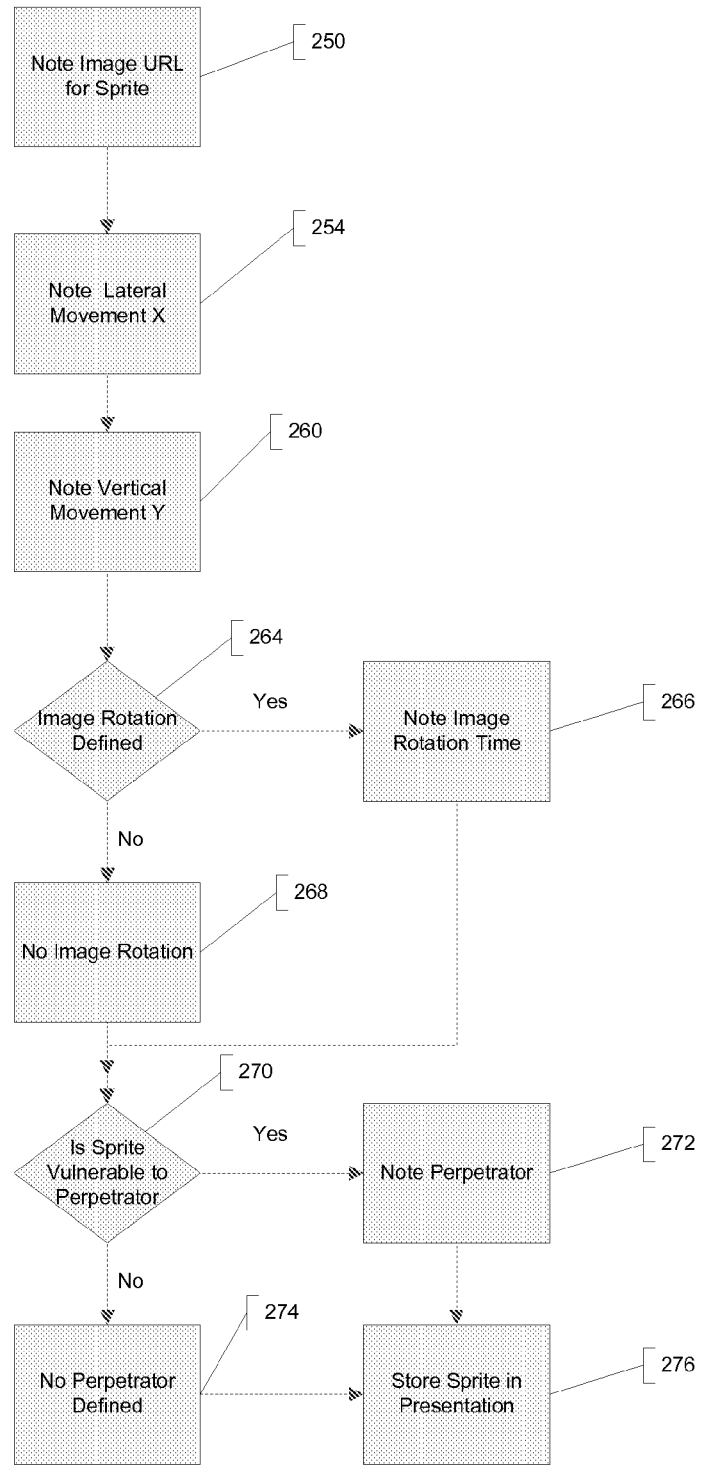
FIG. 7 is a flow diagram of the process for loading instructions for a Lateral Vertical Moving Sprite into the invention.

FIG. 7 is a flow diagram that describes how a Lateral and Vertical Moving Sprite is created for a Presentation by the invention from the instructions sent by the web application server. Vertical and Lateral Sprites consist of an image that moves either vertical, which may appear like jumping, or lateral which may appear like walking. Some Sprites may be enabled to move both laterally and vertically which could appear like a bouncing ball. The image URL must be specified in the instructions (step 250). The instructions specifying lateral and or vertical movements for the Sprite are read by the invention (steps 254 through 260). If the image for the Sprite is to be changed with movement, the timing is specified in the instructions (steps 264 and 266). If a perpetrator is defined for this Sprite in the instructions, this is noted by the invention (steps 270 and 272). The instructions for the Sprite is then stored in the Presentation (step 276).

Figure 8:
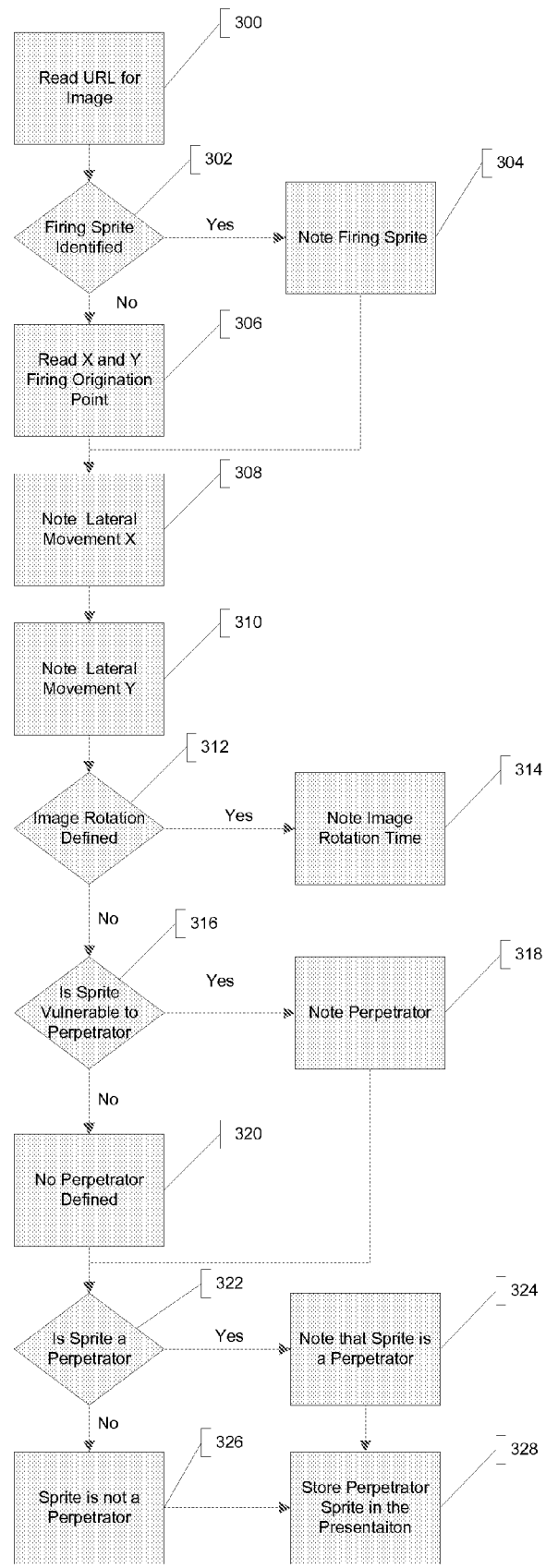
FIG. 8 is a flow diagram of the process for loading instructions for a Projectile Sprite into the invention.

FIG. 8 is a flow diagram that describes how a Projectile Sprite is added to a Presentation by the invention. A Projectile Sprite is similar to a Lateral Vertical Sprite, but its movements are in relation to a Firing Sprite. A Projectile Sprite must have a URL for the image to be displayed (step 300). The Firing Sprite, which can be any other Sprite but another Projectile Sprite, can be specified in the instructions (steps 302 and 304). If no Firing Sprite is specified, then the X and Y coordinate for the firing origination point is read from the instructions (step 306). The lateral and vertical movement must be defined in the instructions for the Projectile Sprite (steps 308 and 310). If the image is to be changed, that is defined in the instructions (steps 312 and 314). Projectile Sprites can be perpetrators and it can also have a perpetrator defined (steps 316 through 326). The instructions for the Perpetrator Sprite are then stored in the Presentation (step 328).

Figure 9:
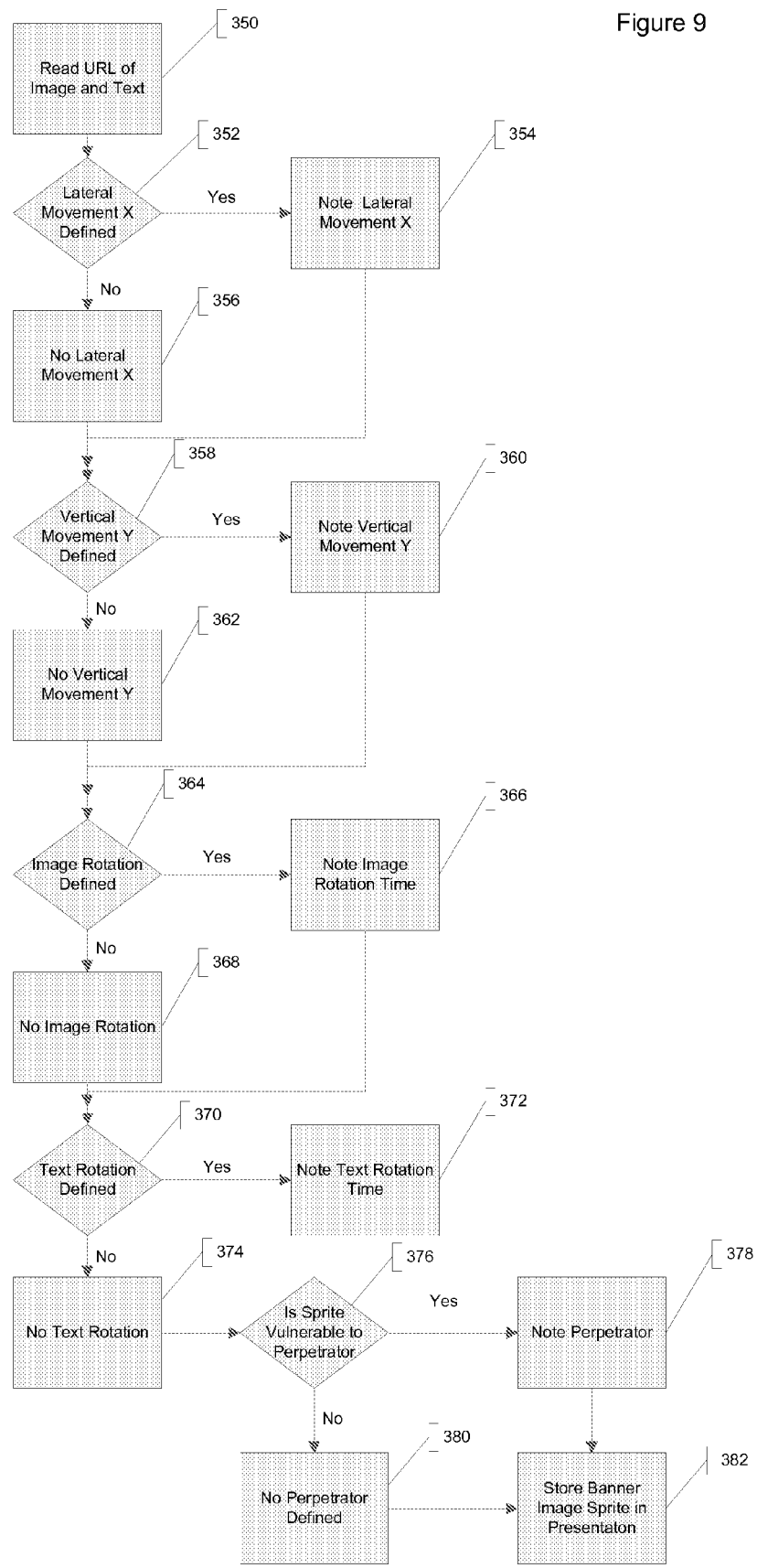
FIG. 9 is a flow diagram of the process for loading instructions for a Rotating Banner Text Sprite into the invention.

FIG. 9 is a flow diagram that describes how a Rotating Banner Text Sprite is created by the invention for a Presentation. A Rotating Banner Text Sprite is a series of images which appear as a banner on the device screen. Text may also be displayed on the Sprite. The images for the banner and the text may be changed or rotated during the Presentation.

The instructions for a Banner Sprite must include the URL and text to be displayed (step 350). The instructions may also include text for the Sprite (step 350). A Banner Text Sprite may also move either laterally or vertically or both (steps 352 through 362). The image and or the text on the Banner Text Sprite can change during the Presentation (steps 364 through 374) If the Sprite has a perpetrator defined that is read from the instructions (steps 376 and 380). After the instructions for the Banner Text Sprite have been read, it is saved in the Presentation (step 382).

After all instructions for the components of the Presentation are received from the web application server; it saves the instructions in device memory (FIG. 3 step 56). The invention then checks for more Presentations (step 58). If another one is detected, it instantiates a new Presentation and loops through all the Presentation instructions and saves them to memory as well (steps 32 through 54). Once all instructions for the collection of Presentations are loaded, the invention terminates the Presentation loading background thread (step 60) and creates a new thread for running Presentations (step 62). It then proceeds to build the first Presentation in the run Presentation background thread, according to the instructions stored in the Presentation (step 64).

Figure 10A:
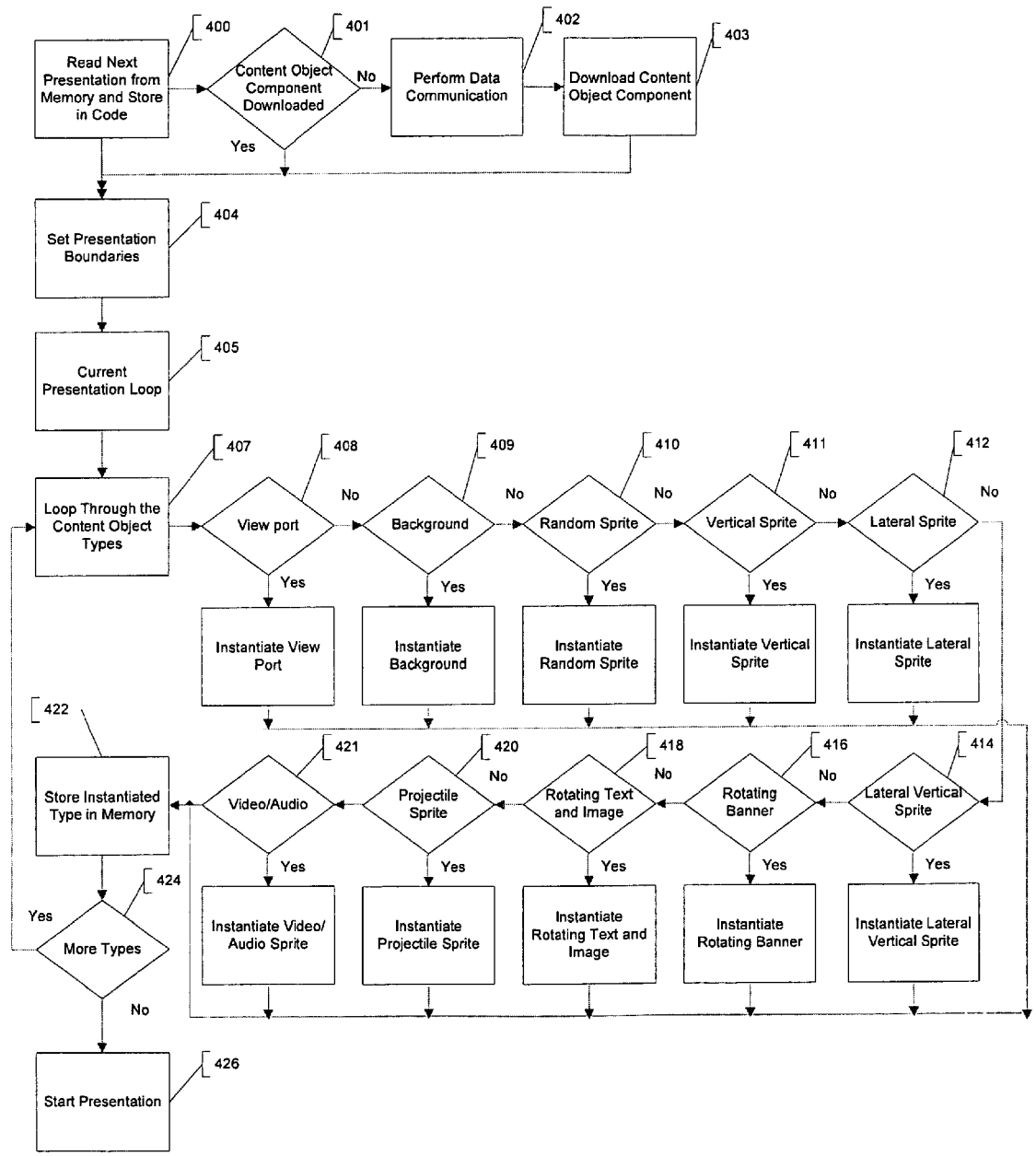
FIG. 10A is a flow diagram of the process of building a Presentation that has been loaded into the invention.

FIG. 10A is a flow diagram of how the Presentations are built by the invention and displayed on the mobile networked device screen. In a background thread in the invention running on the device, instructions for Presentations are loaded from memory (step 400). If content object components for the Presentation have not already been downloaded and stored on the device (step 401), then the invention requests and performs data communication (step 402) to download the content object components for the Presentation (step 403).

The invention then sets the boundaries of the Presentation as specified in the instructions (step 404). All movement and location of the Presentation components will be governed by these coordinate boundaries as well as how the Presentation fits with other components in the application on the screen.

At step 407, the process loops through the Presentation types defined in the instructions and instantiates each Presentation type (e.g., Sprite, Background, Video/Audio or view port) using the graphical capabilities of the programming language of the implementation (steps 408 through 424) and stores them in memory (step 422). After all the Presentation Sprites have been created, the Presentation is started (step 426 to FIG. 10B).

Once a Presentation is loaded, a control loop is created (step 427). In the control loop, user keyboard input is checked (step 428) and then the process loops through the array of Presentation Sprites and other content objects (including Video/Audio in step 438V); reads the instructions regarding the various content objects in the Presentation; passes the keyboard actions to the content objects; and creates and or adjusts the behavior and location of the Sprites with the graphical capabilities of the implementation programming language (steps 429 through 438). After all Presentation Sprites and content objects have been adjusted, the Presentation area of the device display is repainted (step 439).

If the Presentation time has elapsed (step 440), the invention removes all objects from the screen, clears out the Presentation array and reclaims memory (step 441). The invention then checks to see if this was the last Presentation (step 442) and if not, it begins to build the next Presentation and presents it (step 445). If another Presentation does not exist, it checks the instructions to see if it should initiate data communications to download more Presentations (step 443). If so, the invention begins data communications to load more instructions for Presentations from the web application server (step 444), and if not, it begins to load the first Presentation in memory (step 446). An alternate implementation is to initiate data communication and download new instructions for Presentations before the end of the last Presentation currently running on the mobile networked device.

Figure 11:
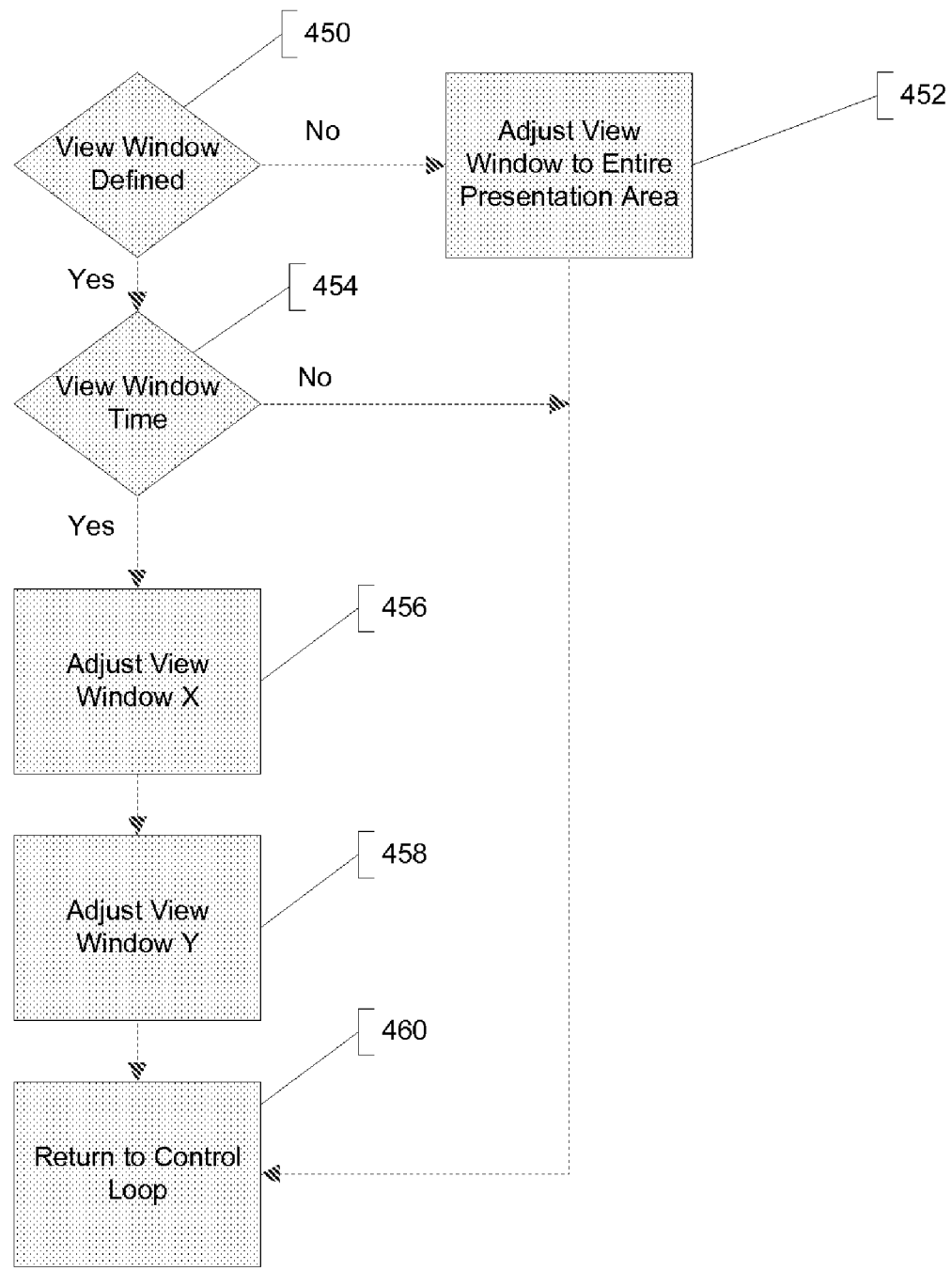
FIG. 11 is a flow diagram of the process of controlling the Presentation View Window that has been loaded into the invention.

FIG. 11 is a flow diagram that describes how a View Window is created by the invention for the Presentation. If a View Window is not defined (step 450), the entire Presentation boundary is used as the View Window (step 452); otherwise a check is done to see if time has elapsed to adjust the View Window (step 454). If it is time to adjust the View Window, the X and Y coordinate for the View Window is adjusted (steps 456 and 458). If it is not time, then control is then returned to the Presentation Control Loop (step 460). After the View Window has been adjusted, control is then returned to the Presentation Control Loop (step 460).

Figure 12:
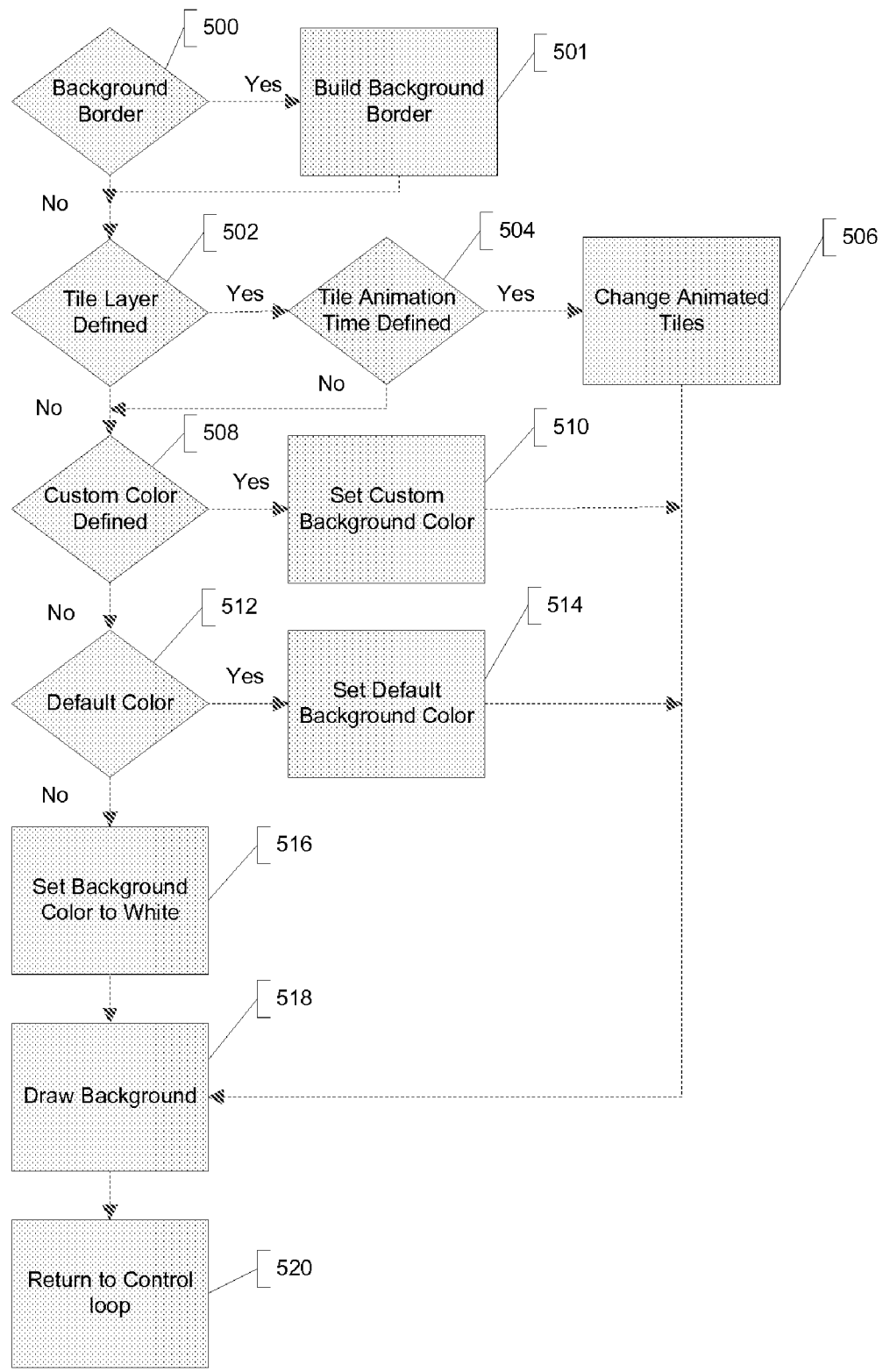
FIG. 12 is a flow diagram of the process of controlling the Presentation Background that has been loaded into the invention.

FIG. 12 is a flow diagram that describes how a Background is created by the invention for a Presentation. If a Background boarder is specified in the instructions, then it is drawn (step 500 and 501). If a Tiled Layer has been defined for the Presentation (step 502), then a check is done to see if tile animation has been defined (step 504) and if so, the tiles are changed (step 506). If a Tiled Layer has not been defined for the in the instructions for the Presentation, then a check is done to see if a custom Background color has been specified (step 508). If a custom color is defined for the Presentation, then the custom color is set for the Background (step 510). If one of the default colors has been chosen (step 512), then the chosen default color is set for the Background (step 514). If no Background has been defined for the Presentation, then the Background color is set to white (step 516). The Background is then drawn (step 518) and control is returned to the Presentation Control Loop (step 520).

Figure 13:
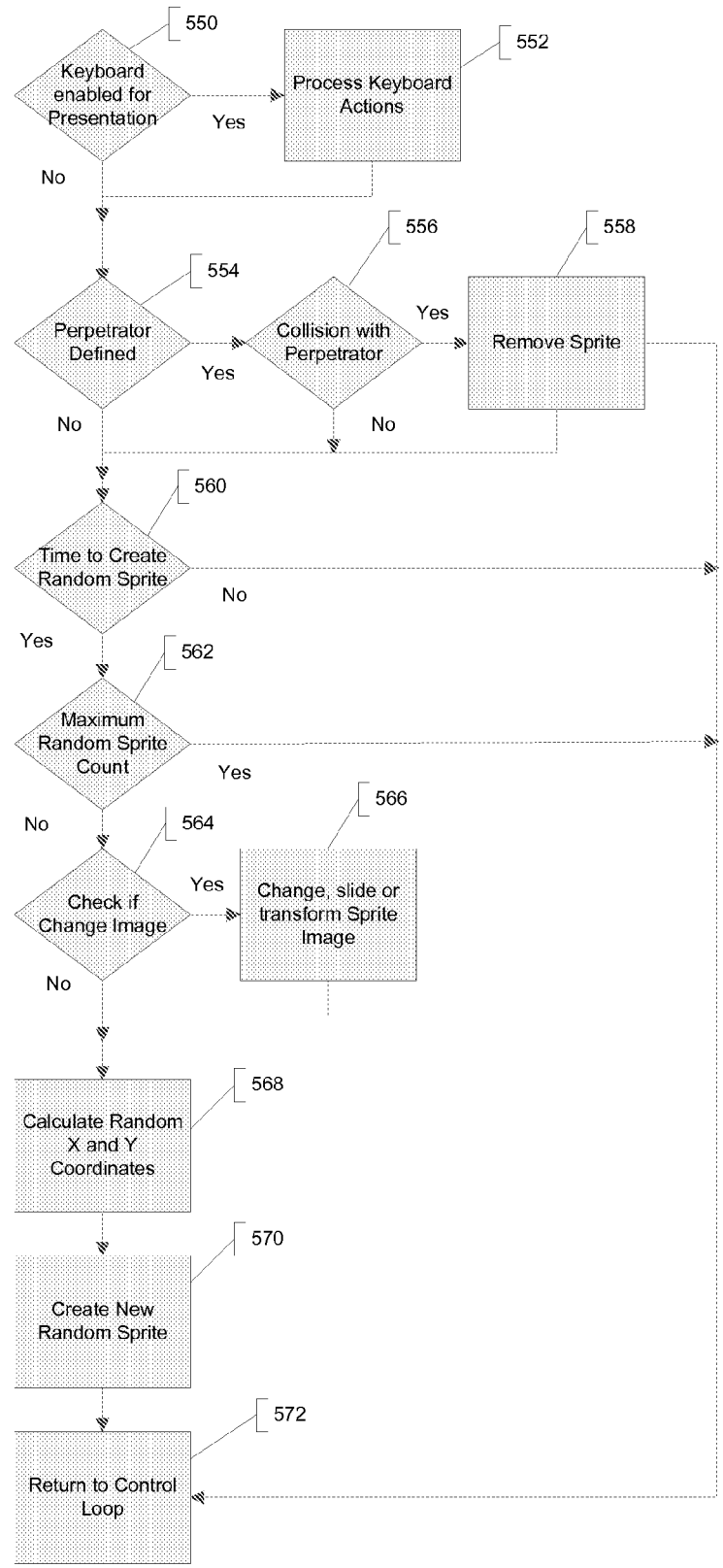
FIG. 13 is a flow diagram of the process of controlling a Random Sprite that has been loaded into the invention.

FIG. 13 is a flow diagram that describes how a Random Sprite is created and behaves in the invention. If a Random Sprite has been defined in the instructions for the Presentation, a check is made to determine if keyboard actions are enables for the Sprite (step 550) and if so, the keyboard actions are processed (step 552). A check is then done to see if a Perpetrator Sprite has been defined (step 554) and if so, a check is made to determine which Random Sprite has had a collision with the Perpetrator Sprite (step 556). If a collision has occurred with any Random Sprites previously created, they are removed from the Presentation (step 558).

If the time between Random Sprite creation has not expired (step 560), then control is returned to the Presentation Control Loop (step 572). If it is time to create a Random Sprite, a check is done to see if the maximum Sprite count has been exceeded (step 562). If the count is above the maximum count defined, then control is returned to the Presentation Control Loop (step 572). Otherwise, a check is made to see if image change has been defined for the Random Sprite creation (step 564) and if so, the image is rotated (step 566). The random X and Y coordinates for placement of the Random Sprite on the Presentation are calculated (step 568) and the Random Sprite is created (step 570). Control is then returned to the Presentation Control Loop (step 572).

Figure 14:
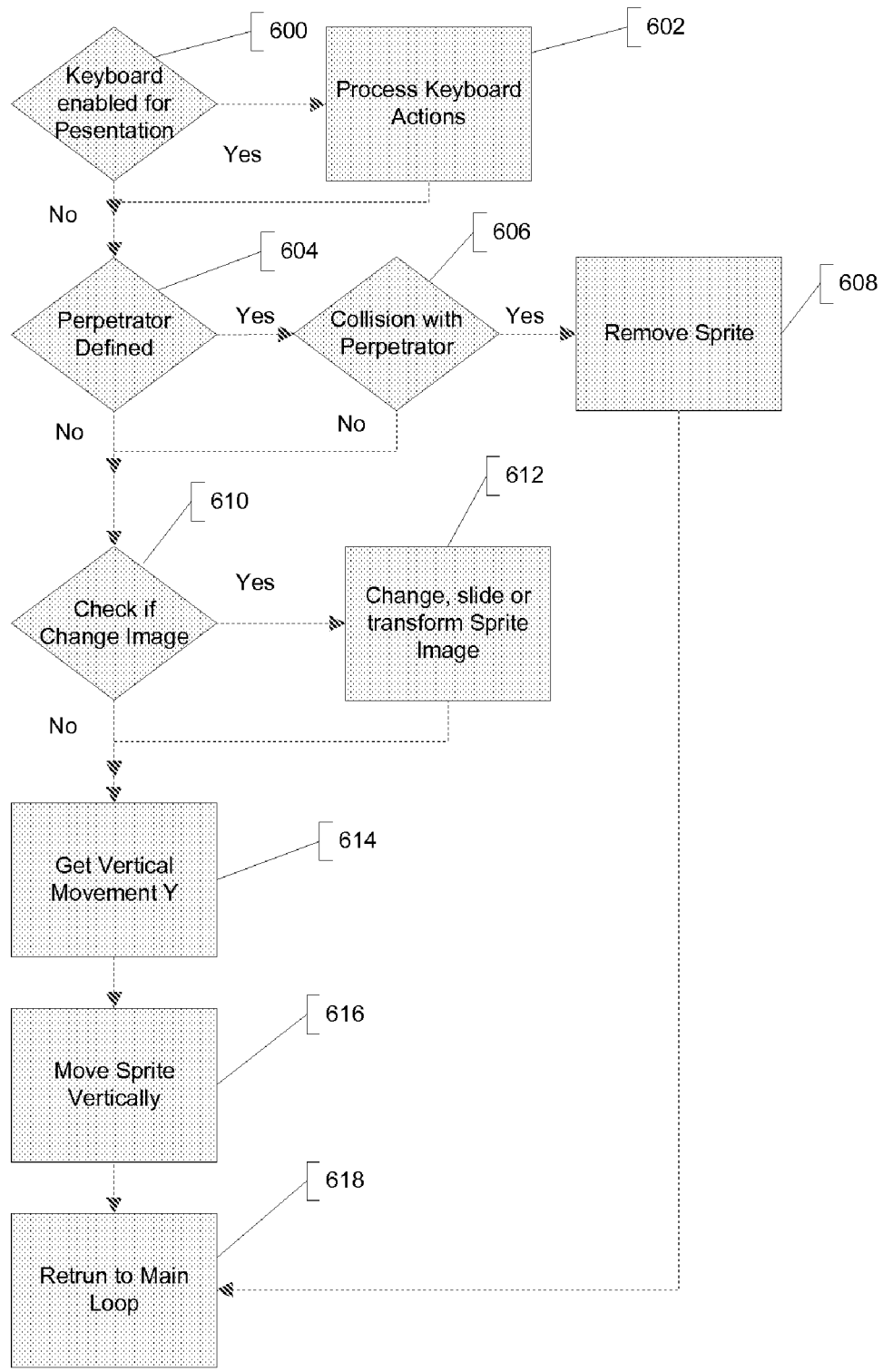
FIG. 14 is a flow diagram of the process of controlling a Vertical Moving Sprite that has been loaded into the invention.

FIG. 14 is a flow diagram that describes how a Vertical Moving Sprite is created and behaves in the invention. If a Vertical Moving Sprite has been defined in the instructions for the Presentation, a check is done to determine if keyboard actions are enabled for the Sprite (step 600) and if so, the keyboard actions are processed (step 602). A check is then done to see if a Perpetrator Sprite has been defined (step 604) and if so, a check is made to determine if the Vertical Moving Sprite has had a collision with the Perpetrator Sprite (step 606). If a collision has occurred with the Perpetrator Sprite, the Vertical Moving Sprite is removed from the Presentation (step 608).

A check is then done to see if image change has been defined for the Vertical Moving Sprite (step 610) and if so, the image is rotated (step 612). The Y coordinate is then determined for placement according to the instructions and any keyboard input (step 614) and the Sprite is moved (step 616). Control is then returned to the Presentation Control Loop (step 618).

Figure 15:
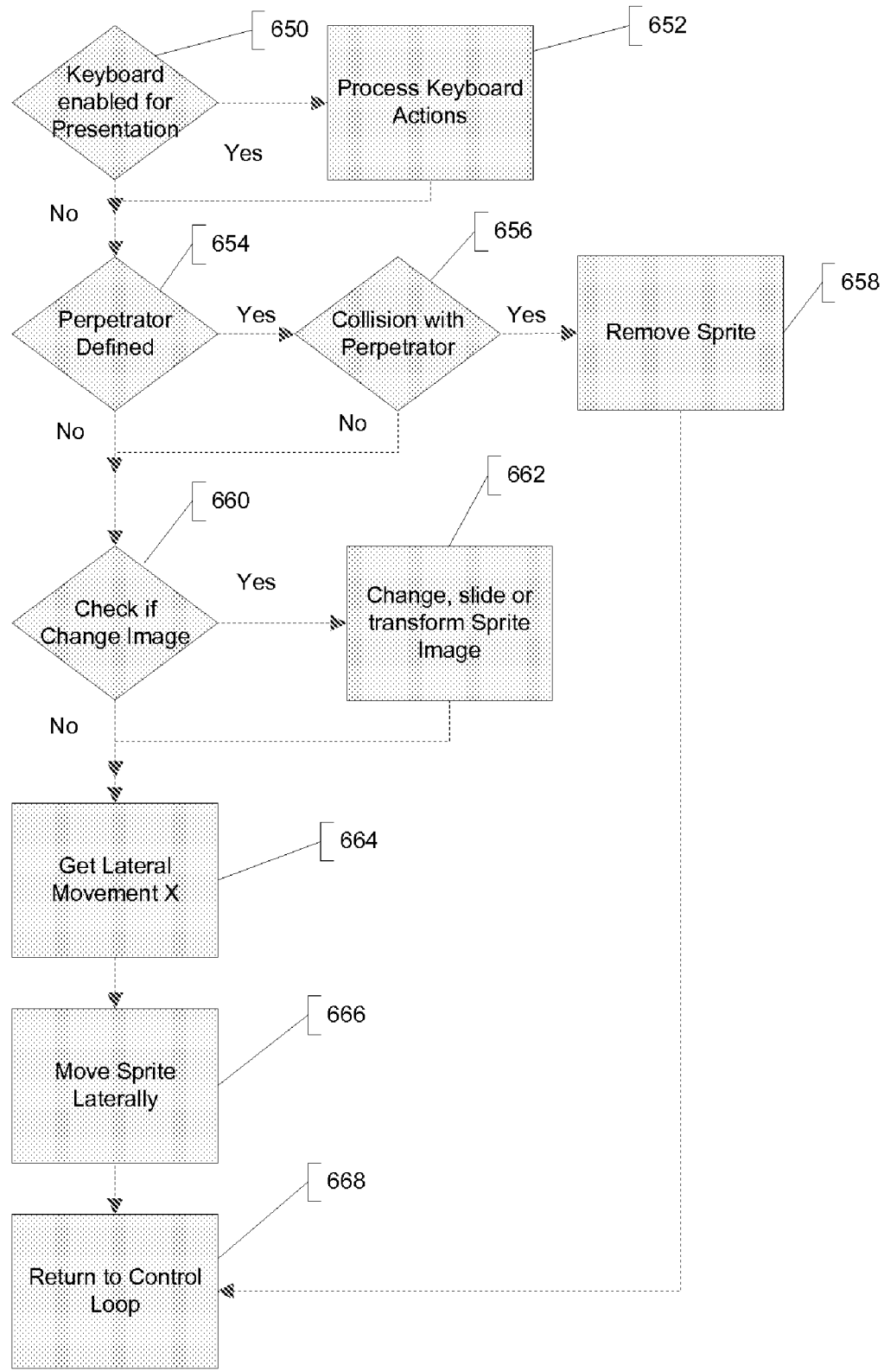
FIG. 15 is a flow diagram of the process of controlling a lateral moving Sprite that has been loaded into the invention.

FIG. 15 is a flow diagram that describes how a Lateral Moving Sprite is created and behaves in the invention. If a Lateral Moving Sprite has been defined in the instructions for the Presentation, a check is done to determine if keyboard actions are enables for the Sprite (step 650) and if so, the keyboard actions are processed (step 652). A check is then made to see if a Perpetrator Sprite has been defined in the instructions for the Presentation (step 654) and if so, a check is done to determine if the Lateral Sprite has had a collision with the Perpetrator Sprite (step 656). If a collision has occurred with the Perpetrator Sprite, the Lateral Sprite is removed from the Presentation (step 658).

A check is then done to see if image change has been defined in the instructions for the Lateral Sprite (step 660) and if so, the image is rotated (step 662). The X coordinate is then determined for placement according to the instructions and any keyboard input (step 664 and 666). Control is then returned to the Presentation Control Loop (step 668).

Figure 16:
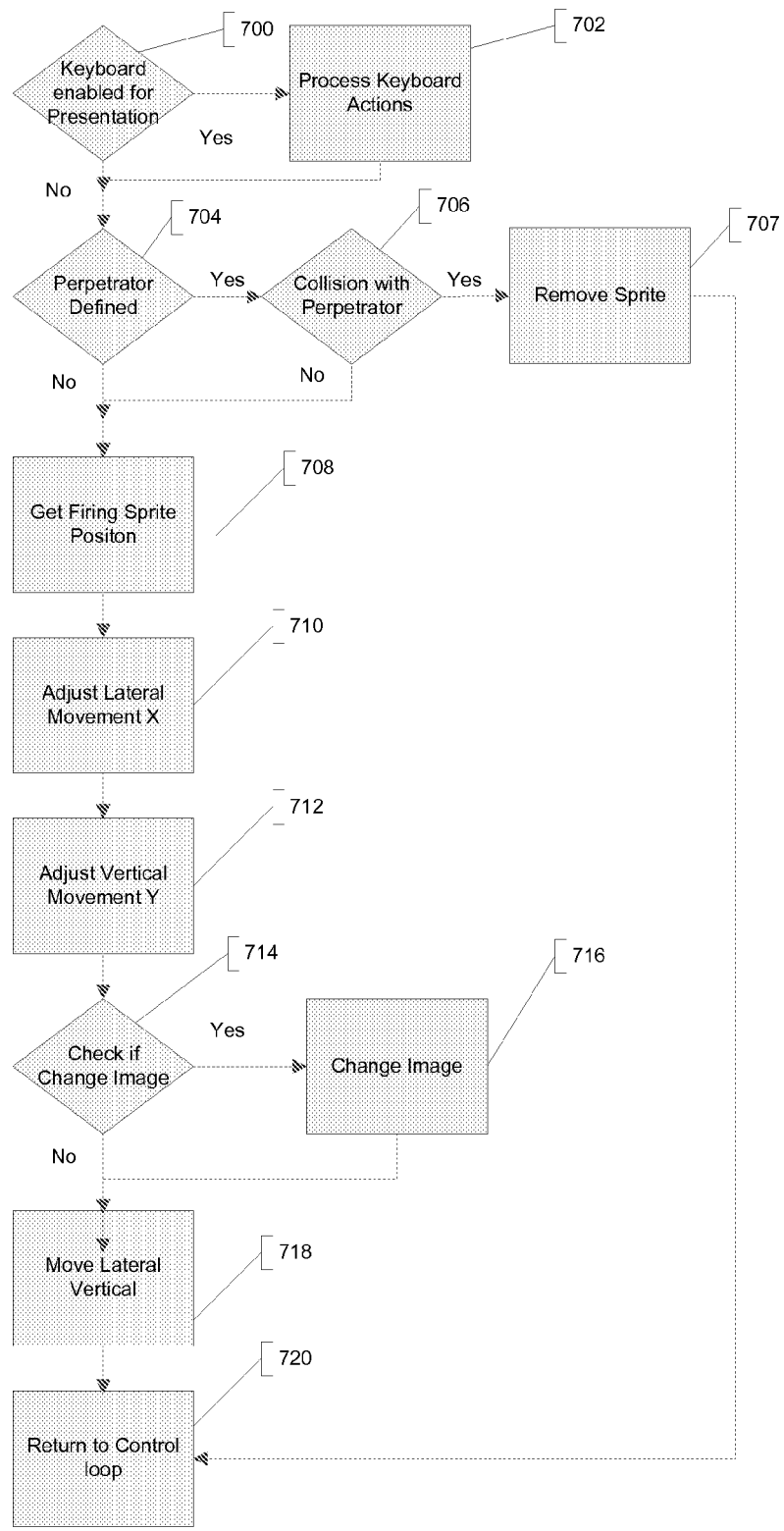
FIG. 16 is a flow diagram of the process of controlling a Projectile Sprite that has been loaded into the invention.

FIG. 16 is a flow diagram that describes how a Projectile Sprite is created and behaves in the invention. If a Projectile Sprite has been defined in the instructions for the Presentation, a check is done to determine if keyboard actions are enabled for the Sprite (step 700) and if so, the keyboard actions are processed (step 702). A check is then done to see if a Perpetrator Sprite has been defined in the instructions for the Presentation (step 704) and if so, a check is made to determine if any of the Projectile Sprites have had a collision with the Perpetrator Sprite (step 706). If a collision has occurred with the Perpetrator Sprite, the Projectile Sprite is removed from the Presentation (step 707) and control is then returned to the Presentation Control Loop (step 720).

The X and Y coordinate of the Sprite designated as the Firing Sprite is then determined for origination of the movements of the Projectile Sprite (step 708). The X and Y coordinates is then determined for placement in reference to the Firing Sprite location according to the instructions and any keyboard input (step 710 and 712). A check is then done to see if image change has been defined for the Projectile Sprite (step 714) and if so, the image is rotated (step 716). The Projectile Sprite is then moved (step 718) and control is then returned to the Presentation Control Loop (step 720).

Figure 17:
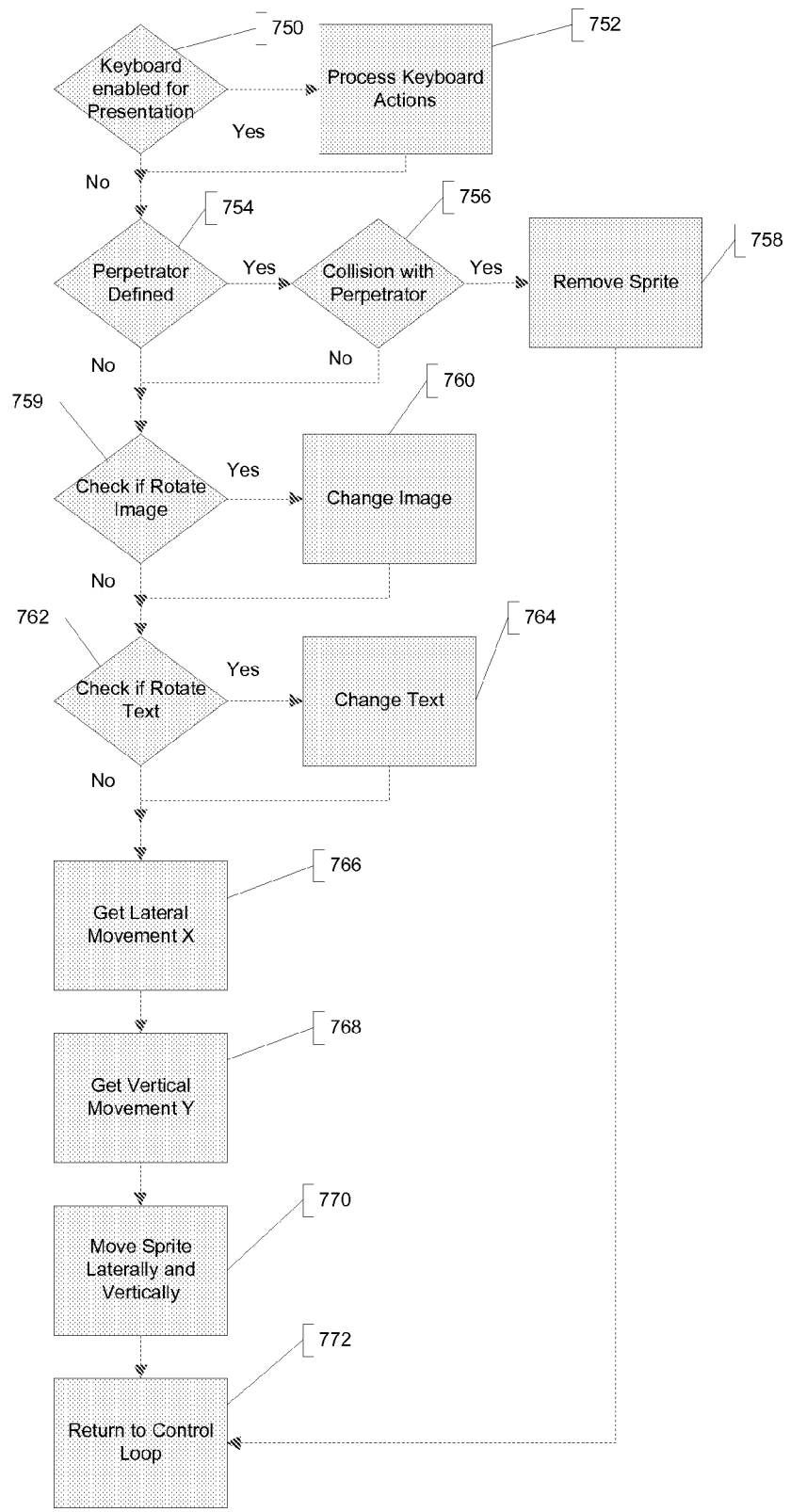
FIG. 17 is a flow diagram of the process of controlling a Rotating Banner and Text Sprite that has been loaded into the invention.

FIG. 17 is a flow diagram that describes how a Rotating Banner Text Sprite is created and behaves in the invention. If a Rotating Banner Text Sprite has been defined in the instructions for the Presentation, a check is done to determine if keyboard actions are enables for the Sprite (step 750) and if so, the keyboard actions are processed (step 752). A check is then done to see if a Perpetrator Sprite has been defined (step 754) and if so, a check is made to determine if the Rotating Banner Text Sprite has had a collision with the Perpetrator Sprite (step 756). If a collision has occurred with the Perpetrator Sprite, the Rotating Banner Text Sprite is removed from the Presentation (step 758) and control is then returned to the Presentation Control Loop (step 772).

A check is then done to see if image change has been defined in the instructions for the Rotating Banner Text Sprite (step 759) and if so, the image is rotated (step 760). If rotate text has been defined for the Rotating Banner Text Sprite (step 762), the text is rotated (step 764).

The X and Y coordinates are then determined for placement according to the instructions and any keyboard input (step 766 and 768). Rotating Banner Text Sprite is then moved on the Presentation (step 770). The Control is then returned to the Presentation Control Loop (step 772).

Figure 18:
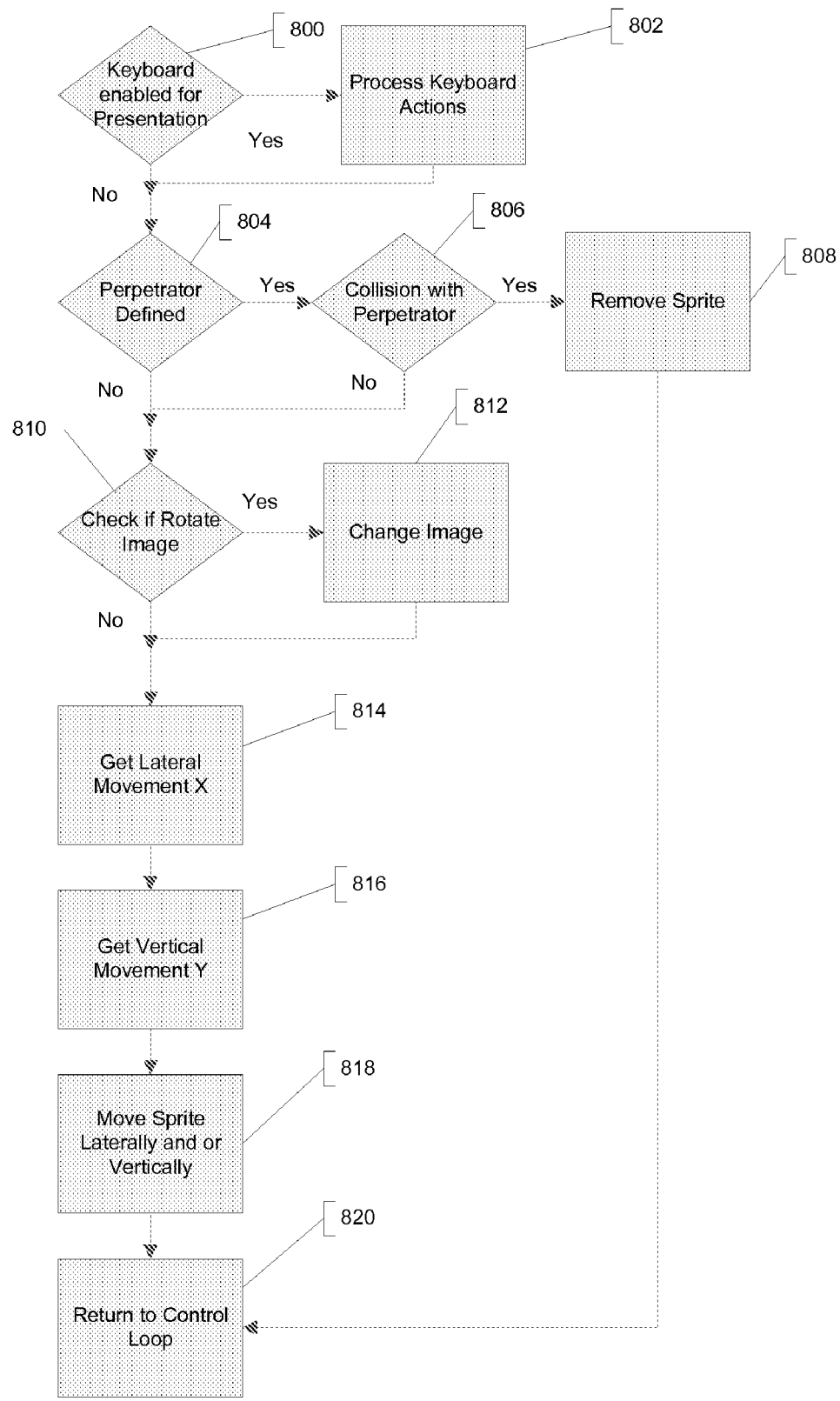
FIG. 18 is a flow diagram of the process of controlling a Rotating Banner Sprite that has been loaded into the invention.

FIG. 18 is a flow diagram that describes how a Rotating Banner Sprite is created and behaves in the invention. If a Rotating Banner Sprite has been defined in the instructions for the Presentation, a check is done to determine if keyboard actions are enables for the Sprite (step 800) and if so, the keyboard actions are processed (step 802). A check is then done to see if a Perpetrator Sprite has been defined in the instructions for the Presentation (step 804) and if so, a check is made to determine if the Rotating Banner Sprite has had a collision with the Perpetrator Sprite (step 806).

If a collision has occurred with the Perpetrator Sprite, the Rotating Banner Sprite is removed from the Presentation (step 808) and control is then returned to the Presentation Control Loop (step 820).

A check is then done to see if image change has been defined for the Rotating Banner Sprite (step 810) and if so, the image is rotated (step 812).

The X and Y coordinates are then determined for placement according to the instructions and any keyboard input (step 814 and 816). Rotating Banner Sprite is then moved on the Presentation (step 818). Control is then returned to the Presentation Control Loop (step 820).

Figure 19:
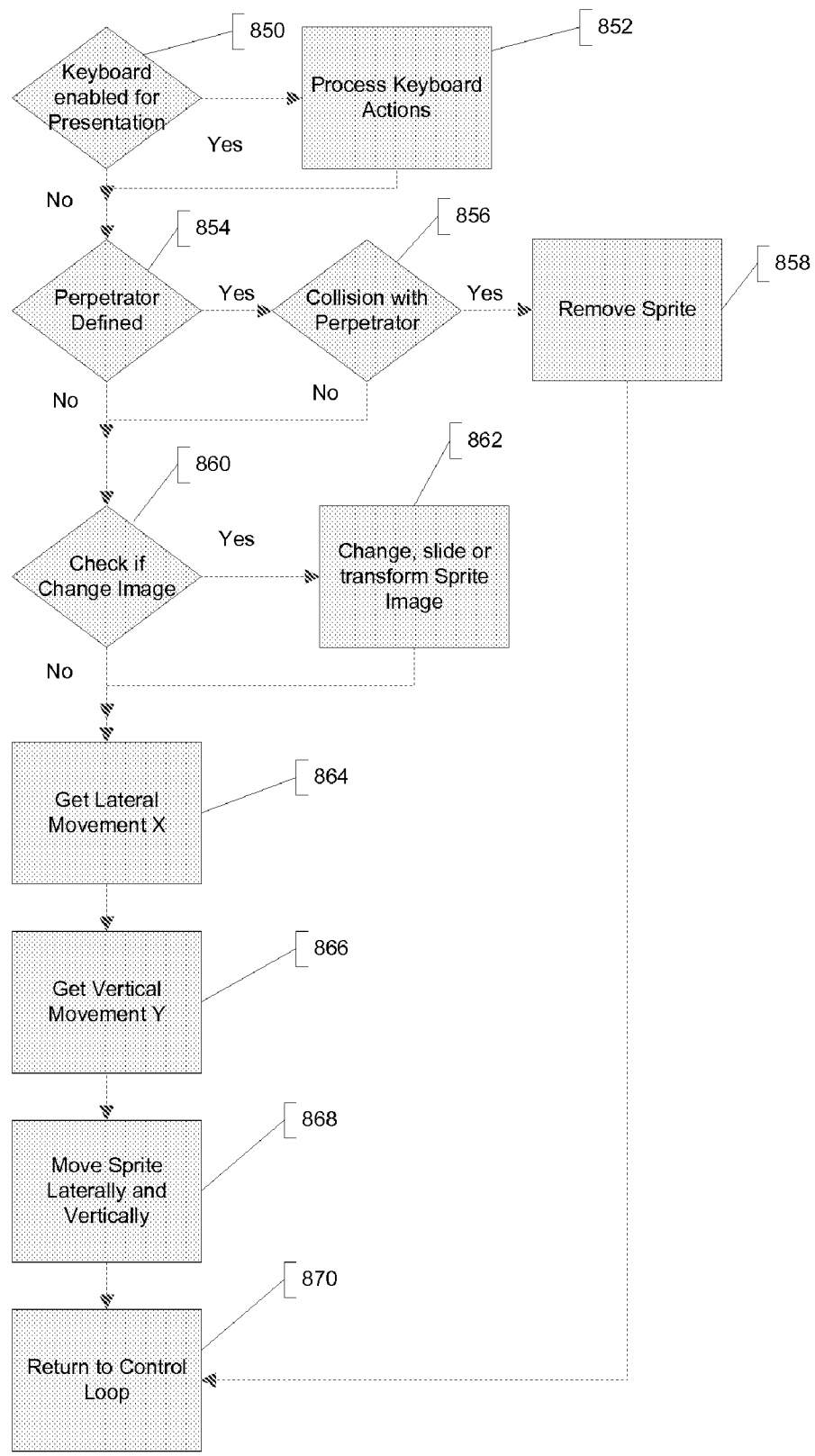
FIG. 19 is a flow diagram of the process of controlling a Lateral and Vertical Moving Sprite that has been loaded into the invention.

FIG. 19 is a flow diagram that describes how a Lateral Vertical Moving Sprite is created and behaves in the invention. If a Lateral Vertical Sprite has been defined in the instructions for the Presentation, a check is done to determine if keyboard actions are enables for the Sprite (step 850) and if so, the keyboard actions are processed (step 852). A check is then done to see if a Perpetrator Sprite has been defined in the instructions for the Presentation (step 854) and if so, a check is made to determine if the Lateral Vertical Sprite has had a collision with the Perpetrator Sprite (step 856). If a collision has occurred with the Perpetrator Sprite, the Lateral Vertical Sprite is removed from the Presentation (step 858) and control is then returned to the Presentation Control Loop (step 870).

A check is then done to see if image change has been defined for the Lateral Vertical Sprite (step 860) and if so, the image is rotated (step 862). The X and Y coordinates are then determined for placement according to the instructions and any keyboard input (step 864 and 866). The Lateral Vertical Sprite is then moved on the Presentation (step 868). Control is then returned to the Presentation Control Loop (step 870).

If the Presentation time has elapsed, as specified in the instructions for the Presentation, the invention removes all objects from the screen, clears out the Presentation array and reclaims memory (FIG. 10B step 441). The invention then checks to see if there is another Presentation (step 442) and if so, it begins to build that Presentation and displays it on the device (step 445). If it is the last Presentation, the inventions checks to see if there are instructions to download more Collections of Presentations (step 443). If so, it initiates data communication to the web application server (step 444) and downloads more instructions for Presentations as described in FIG. 2. If not it begins with the first Presentation in memory and builds that one for display on the device (step 446).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for producing presentations on a mobile networked device, comprising:
   a) loading said mobile networked device with compiled computer code that implements aspects of graphical animation capabilities to effect automated execution of the presentations, wherein said graphical animation capabilities include at least one of lateral movement, vertical movement, timing of movement and behavior, to display and change said presentations using at least one of an application, an operating system of the device, or a browser plugin, without having to program, compile and download a new set of code on said mobile networked device, and
   b) subsequent to said loading, triggering the execution of selected ones of said aspects of graphical animation capabilities by new instructions requested and received by said compiled computer code on said mobile networked device over a network to constitute said presentations, said new instructions characterized as other than compiled code, web pages or scripting language,
   wherein:
      i) said presentations require at least one content object;
      ii) said new instructions trigger said selected ones of said aspects of graphical animation capabilities on said at least one content object to produce at least one of said presentations and can be further ordered to constitute a plurality of said presentations to represent a collection of said presentations; and
      iii) said new instructions trigger different said selected ones of said aspects of graphical animation capabilities on said at least one content object to produce at least one new of said at least one of said presentations without having to said program, compile and download a new set of code on said mobile networked device.

2. The method of claim 1, further comprising making changes to said at least one of said presentations by changing said new instructions to trigger different said aspects of graphical animation capabilities in said compiled computer code on said at least one content object selected from the group of graphic image, graphic images in a frame sequence for animation, audio, video and text element; thus not requiring said program, compile and download a new set of code on said mobile networked device for every desired change in said at least one of said presentations.

3. The method of claim 2, further comprising, programming a server to store said new instructions to create said collection of said presentations on said mobile networked device, wherein:
   i) said server responds to requests from said compiled computer code on said mobile networked device to send a plurality of said stored said new instructions to represent a collection of said new instructions; and
   ii) detailed in said new instructions is the location of said at least one content object selected from the group of existing in said compiled computer code, existing elsewhere on said mobile networked device, previously downloaded with other said presentations and to be newly downloaded.

4. The method of claim 3, further comprising programming a browser to enable the assembly of said new instructions and to send said assembly of said new instructions to said server for storage.

5. The method of claim 4, further comprising an entity providing said programmed browser and said assembly of said new instructions as a service to users of said mobile networked device.

6. The method of claim 5, wherein utilization of said service provided by said entity relieves said entity from the burden of said program, compile and download a new set of code to said mobile networked device when a change is desired in said collection of presentations which may appear as advertising, games and other informational content to customers who are said users of said mobile networked device.

7. The method of claim 6, further comprising: said user of said mobile networked device utilizing said service from a plurality of said entities; and storing URL addresses of said servers on said mobile networked device of said user.

8. The method of claim 7, further comprising presenting to said user a new said collection of said presentations based upon geographical location determined by GPS on said mobile networked device.

9. The method of claim 8, further comprising programming said compiled computer code to collect interaction data regarding said user with said at least one of said presentations; and transferring said interaction data to said server.

10. The method of claim 9, wherein said interaction data triggers said aspects of graphical animation capabilities in said compiled computer code to affect said at least one content object in said at least one of said presentations.

11. The method of claim 10, further comprising using said interaction data to redirect said user to web pages on web servers of said entity on the browser on said mobile networked device.

12. The method of claim 11, wherein said entity benefits from said interaction data by being able to identify interests of said user in at least one of the products and services offered by said entity, thus enabling said entity to target said presentations to said user of said service on said mobile networked device.

13. The method of claim 1, further comprising abstracting graphical animation capabilities available in a programming language into said aspects of graphical animation capabilities.

14. The method of claim 13, wherein said graphical animation capabilities include at least one of graphical display, movement logic, and/or behavior.

15. The method of claim 1, further comprising loading into compiled code on the mobile networked device one of a subset of graphical capabilities or all graphical capabilities available in a programming language into said aspects of graphical animation capabilities.

16. The method of claim 1, wherein said received new instructions are in the form of integers, characters or bitmasks in a text file.

17. A mobile networked device configured to produce presentations, comprising:
   a) compiled computer code loaded on said mobile networked device that implements aspects of graphical animation capabilities to effect automated execution of the presentations, wherein said graphical animation capabilities include at least one of lateral movement, vertical movement, timing of movement and behavior, to display and change said presentations using at least one of an application, an operating system of the device, or a browser plugin, without having to program, compile and download a new set of code on said mobile networked device, and
   b) said mobile networked device and said loaded compiled computer code requesting and receiving new instructions over a network subsequent to loading of said compiled computer code, to trigger the execution of selected ones of said aspects of graphical animation capabilities to constitute said presentations, said new instructions characterized as other than compiled code, web pages, or scripting language,
   wherein:
   iv) presentations require at least one content object;
   v) said new instructions trigger said selected ones of said aspects of graphical animation capabilities on said at least one content object to produce at least one of said presentations and can be further ordered to constitute a plurality of said presentations to represent a collection of said presentations; and
   vi) said new instructions trigger different said selected ones of said aspects of graphical animation capabilities on said at least one content object to produce at least one new of said at least one of said presentations without having to said program, compile and download a new set of code on said mobile networked device.

18. The mobile networked device of claim 17, wherein changes are made to said at least one of said presentations by changing said new instructions to trigger different said aspects of graphical animation capabilities in said compiled computer code on said at least one content object selected from the group of graphic image, graphic images in a frame sequence for animation, audio, video and text element; thus not requiring said program, compile and download a new set of code for every desired change in said at least one of said presentations on said mobile networked device.

19. The mobile networked device of claim 17, in combination with a server to store said new instructions to create said collection of said presentations on said mobile networked device, wherein:
   i) said server responds to requests from said compiled computer code on said mobile networked device to send a plurality of said stored said new instructions to represent a collection of said new instructions; and
   ii) detailed in said new instructions is the location of said at least one content object selected from the group of existing in said compiled computer code, existing elsewhere on the said mobile networked device, previously downloaded with other said presentations and to be newly downloaded.

20. The mobile networked device of claim 17, further comprising a browser programmed to enable the assembly of said new instructions and to send said assembly of said new instructions to said server for storage.

21. The mobile networked device of claim 20, in combination with an entity providing said browser programmed and said assembly of said new instructions as a service to users of said mobile networked device.

22. The combination of claim 21, wherein utilization of said service provided by said entity relieves said entity from the burden of said program, compile and download a new set of code to said mobile networked device when a change is desired in said collection of presentations which may appear as advertising, games and other informational content to customers who are said users of said mobile networked device.

23. A server for operation with a mobile networked device via a network, said mobile networked device configured to produce presentations, said server comprising:
   a) programming code on said server to interact with compiled computer code loaded on said mobile networked device, said compiled computer code implementing aspects of graphical animation capabilities to effect automated execution of the presentations, wherein said graphical animation capabilities include at least one of lateral movement, vertical movement, timing of movement and behavior, to display and change said presentations using at least one of an application, an operating system of the device, or a browser plugin, without having to program, compile and download a new set of code on said mobile networked device, and
   b) said server, when triggered by a request, subsequent to loading of said compiled computer code, from said compiled computer code on said mobile networked device providing new instructions, said new instructions characterized as other than compiled code, web pages, or scripting language, to said mobile networked device over said network, said new instructions trigger the execution of selected ones of said aspects of graphical animation capabilities to constitute said presentations, wherein:
   vii) said presentations require at least one content object;
   viii) said new instructions trigger said selected ones of said aspects of graphical animation capabilities on said at least one content object to produce at least one of said presentations and can be further ordered to constitute a plurality of said presentations to represent a collection of said presentations; and
   ix) said new instructions trigger different said selected ones of said aspects of graphical animation capabilities on said at least one content object to produce at least one new of said at least one of said presentations without having to said program, compile and download a new set of code on said mobile networked device.

24. The server of claim 23, wherein said server facilitates making changes to said at least one of said presentations by changing said new instructions from said server to trigger different said aspects of graphical animation capabilities in said compiled computer code on said at least one content object selected from the group of graphic image, graphic images in a frame sequence for animation, audio, video and text element; thus not requiring said program, compile and download a new set of code on said mobile networked device for every desired change in said at least one of said presentations.

25. The server of claim 24, configured for communication with a browser, said browser having program code to generate an assembly of said new instructions and to send said assembly of said new instructions to said server for storage.

26. The server of claim 25 wherein the combination with said mobile networked device, said browser program code and said assembly of said new instructions is offered from an entity as a service to users of said browser and said mobile networked device.

27. The server of claim 26, wherein utilization of said service provided by said entity relieves said entity and said users from said program, compile and download a new set of code to said mobile networked device when a change is desired in said collection of said presentations which may appear as advertising, games and other informational content to customers who are said users of said mobile networked device.

* * * * *